United States Patent
Mizutani

(10) Patent No.: US 9,398,080 B2
(45) Date of Patent: Jul. 19, 2016

(54) CONTROL DEVICE, IMAGE PROCESSING DEVICE, CONTROL METHOD, COMPUTER-READABLE RECORDING MEDIUM, AND PROGRAM

(71) Applicant: OMRON Corporation, Kyoto-shi, Kyoto (JP)

(72) Inventor: Seiji Mizutani, Moriyama (JP)

(73) Assignee: OMRON Corporation, Kyoto-shi (JP)

( * ) Notice: Subject to any disclaimer, the term of this patent is extended or adjusted under 35 U.S.C. 154(b) by 165 days.

(21) Appl. No.: 14/384,983

(22) PCT Filed: Mar. 1, 2013

(86) PCT No.: PCT/JP2013/055674
§ 371 (c)(1),
(2) Date: Sep. 12, 2014

(87) PCT Pub. No.: WO2013/137023
PCT Pub. Date: Sep. 19, 2013

(65) Prior Publication Data
US 2015/0058432 A1    Feb. 26, 2015

(30) Foreign Application Priority Data

Mar. 15, 2012  (JP) ................ 2012-058300

(51) Int. Cl.
| | |
|---|---|
| G06F 15/16 | (2006.01) |
| H04L 29/08 | (2006.01) |
| G05B 19/05 | (2006.01) |
| G05B 19/042 | (2006.01) |

(52) U.S. Cl.
CPC ............ *H04L 67/10* (2013.01); *G05B 19/0423* (2013.01); *G05B 19/05* (2013.01); *G05B 19/054* (2013.01); *G05B 19/052* (2013.01); *G05B 2219/1101* (2013.01); *G05B 2219/1215* (2013.01); *G05B 2219/25012* (2013.01); *G05B 2219/25479* (2013.01)

(58) Field of Classification Search
CPC ............ G05B 2219/1215; G05B 2219/40399; G05B 2219/40405; G05B 2219/2231; G05B 2219/2236; H04L 12/40019; H04L 12/40039
USPC ........................................ 709/208
See application file for complete search history.

(56) References Cited

U.S. PATENT DOCUMENTS

| | | | | |
|---|---|---|---|---|
| 5,119,292 A | * | 6/1992 | Baker | G06F 13/374 710/113 |
| 5,131,085 A | * | 7/1992 | Eikill | G06F 15/17 710/110 |
| 2013/0282148 A1 | * | 10/2013 | Koyama | G05B 19/4185 700/56 |

FOREIGN PATENT DOCUMENTS

| | | |
|---|---|---|
| JP | 2010-198600 A | 9/2010 |
| JP | 2011-192068 A | 9/2011 |
| JP | 2011-216085 A | 10/2011 |

OTHER PUBLICATIONS

Martin Rostan; "EtherCAT: Ethernet Control Automation Technology"; [online] Internet <URL: http://www.ethercat.org/pdf/japanese/EtherCAT_Introduction_0904_JPN.pdf> [retrieved on Feb. 29, 2012] (Apr. 4, 2009).

*Primary Examiner* — Phuoc Nguyen
(74) *Attorney, Agent, or Firm* — Mots Law, PLLC

(57) ABSTRACT

Provided is an information processing device constituting at least a part of a communication system. The information processing device includes a master unit connected to a first communication line, and at least one slave unit connected to the master unit via a second communication line. The master unit includes: a first communication unit for transmitting/receiving data with another device via the first communication line in every predetermined cycle; a second communication unit for transmitting/receiving data with the slave unit via the second communication line in a time period shorter than the cycle; and an update unit for, after preceding data is received via the first communication line, updating data with the slave unit via the second communication line before arrival of subsequent data corresponding to the next cycle.

13 Claims, 15 Drawing Sheets

CONTROL DEVICE, IMAGE PROCESSING DEVICE, CONTROL METHOD, COMPUTER-READABLE RECORDING MEDIUM, AND PROGRAM

TECHNICAL FIELD

The present invention relates to data communication in a configuration including a plurality of communication lines.

RELATED ART

In some cases, a configuration is employed in which a single information processing device can use a plurality of different communication lines. For example, a general computer is connected to a communication network (that is to say, a first communication line) such as the Ethernet (registered trademark), and can use various types of devices via an internal bus (that is to say, a second communication line) and the like. Such a configuration is applied to various types of information processing devices.

For example, machines and equipment used at many production sites are typically controlled by a control system constituted by a programmable controller (a Programmable Logic Controller, hereinafter also referred to as a "PLC") and the like. Such a PLC may also be able to use a plurality of communication lines.

The control system is used to control the operations of the machines, equipment, and the like. More specifically, the control system includes an IO (Input/Output) device that handles input of signals from external switches and sensors, as well as output of signals to external relay and actuators. It is preferable that such an IO device is arranged at various locations at production sites. In a general control system, an IO device can be arranged at a location far from a main processing device including a processor for executing various types of control programs. Such an IO device is also referred to as, for example, a "remote IO device" in the sense that it is arranged far from such a main processing device.

Such main processing device and remote IO device may be connected to each other via various types of communication lines. Such communication lines are also referred to as a "field bus". Such a field bus employs a communication method that enables communication in a predetermined cycle (that is to say, enables real-time communication) so as to facilitate synchronization between an update timing of input/output data and an execution timing of a control program. EtherCAT (registered trademark) based on the Ethernet (registered trademark) is known as one communication method used as such a field bus (see, for example, Non-Patent Document 1).

A general remote IO device is often constituted by a plurality of input units and output units. In this case, the plurality of input units and output units perform communication via an internal bus of the remote JO device. In this way, the remote IO device is connected to the field bus and includes the internal bus therein.

RELATED ART DOCUMENTS

Non-Patent Documents

Non-Patent Document 1: Martin Rostan, EtherCAT Technology Group, "EtherCAT: Ethernet Control Automation Technology", [online], Apr. 24, 2009, [retrieved on Feb. 29, 2012], Internet <URL: http://www.ethercat.org/pdf/japanese/EtherCAT_Introduction_0904_JPN.pdf>

SUMMARY OF THE INVENTION

Problem to be Solved by the Invention

In the above-described control system, a cycle for updating data with a main processing device unit and the like via a field bus does not necessarily coincide with a cycle for internally updating data of these input units and output units. Therefore, there are cases in which a timing of data update is delayed.

A similar problem occurs also in the above-described configuration in which a single information processing device can use a plurality of different communication lines.

There is a demand for a configuration that enables more appropriate data update between devices in a configuration including a plurality of communication lines.

Means for Solving the Problems

One aspect of the present invention provides a control device constituting at least a part of a control system. The control device includes a master control unit connected to a first communication line, and at least one slave control unit connected to the master control unit via a second communication line. The master control unit includes: a first communication unit for transmitting/receiving data to/from another device via the first communication line in every predetermined control cycle; a second communication unit for transmitting/receiving data to/from the slave control unit via the second communication line in a time period shorter than the control cycle; and an update unit for, after preceding data is received via the first communication line, updating data with the slave control unit via the second communication line before arrival of subsequent data corresponding to the next control cycle.

It is preferable that the slave control unit includes an input unit for collecting a state value of an externally input signal, and the update unit causes the input unit to newly collect a state value and transmit the collected state value to the master control unit as update processing.

It is further preferable that the update unit orders transmission of the collected state value to the master control unit multiple times.

It is preferable that the update unit starts the update processing for the input unit from a time point that precedes a time point at which the subsequent data is supposed to arrive by a predetermined time period.

It is preferable that the slave control unit further includes an output unit for outputting a signal of a designated state value, and the update unit updates the signal output by the output unit in accordance with at least a part of data received via the first communication line as update processing.

It is further preferable that the update unit transmits an instruction for updating the signal output by the output unit multiple times.

It is further preferable that the master control unit further includes: a first buffer memory for storing data transmitted over the first communication line; a second buffer memory for storing data transmitted over the second communication line; and a transfer circuit for controlling data transfer between the first buffer memory and the second buffer memory. The update unit starts the update processing for the input unit such that storage of the state value collected by the input unit into the second buffer memory, as well as subsequent data transfer from the second buffer memory to the first buffer memory, is completed before arrival of the subsequent data.

It is further preferable that the update unit starts the update processing for the output unit after reception of the preceding data, as well as subsequent transfer of the data from the first buffer memory to the second buffer memory, is completed.

It is further preferable that the update unit executes the update processing for the input unit in parallel with transfer of the preceding data from the first buffer memory to the second buffer memory, and executes the update processing for the output unit in parallel with transfer of the state value collected by the input unit from the second buffer memory to the first buffer memory.

It is preferable that the master control unit further includes a timer shared with another device connected via the first communication line, and the update unit determines a start timing of update processing based on a value measured by the timer.

Another aspect of the present invention provides an information processing device constituting at least a part of a communication system. The information processing device includes a master unit connected to a first communication line, and at least one slave unit connected to the master unit via a second communication line. The master unit includes: a first communication unit for transmitting/receiving data to/from another device via the first communication line in every predetermined cycle; a second communication unit for transmitting/receiving data to/from the slave unit via the second communication line in a time period shorter than the cycle; and an update unit for, after preceding data is received via the first communication line, updating data with the slave unit via the second communication line before arrival of subsequent data corresponding to a next cycle.

Still another aspect of the present invention provides a control method in a control device including a master control unit connected to a first communication line and at least one slave control unit connected to the master control unit via a second communication line, the control device constituting at least a part of a control system. The control method includes steps of, in the master control unit, transmitting/receiving data to/from another device via the first communication line in every predetermined control cycle, transmitting/receiving data to/from the slave control unit via the second communication line in a time period shorter than the control cycle, and after preceding data is received via the first communication line, updating data with the slave control unit via the second communication line before arrival of subsequent data corresponding to a next control cycle.

Still another aspect of the present invention provides a program for realizing the above control method on a computer, and a computer-readable recording medium storing the program.

Still another aspect of the present invention provides a control method in an information processing device including a master unit connected to a first communication line and at least one slave unit connected to the master unit via a second communication line, the information processing device constituting at least a part of a communication system. The control method includes steps of, in the master unit, transmitting/receiving data to/from another device via the first communication line in every predetermined cycle, transmitting/receiving data to/from the slave unit via the second communication line in a time period shorter than the cycle, and after preceding data is received via the first communication line, updating data with the slave unit via the second communication line before arrival of subsequent data corresponding to the next cycle.

Still another aspect of the present invention provides a program for realizing the above control method on a computer, and a computer-readable recording medium storing the program.

Effects of the Invention

The present invention enables more appropriate data update between devices in a configuration including a plurality of communication lines.

EMBODIMENTS OF THE INVENTION

Figure 1:
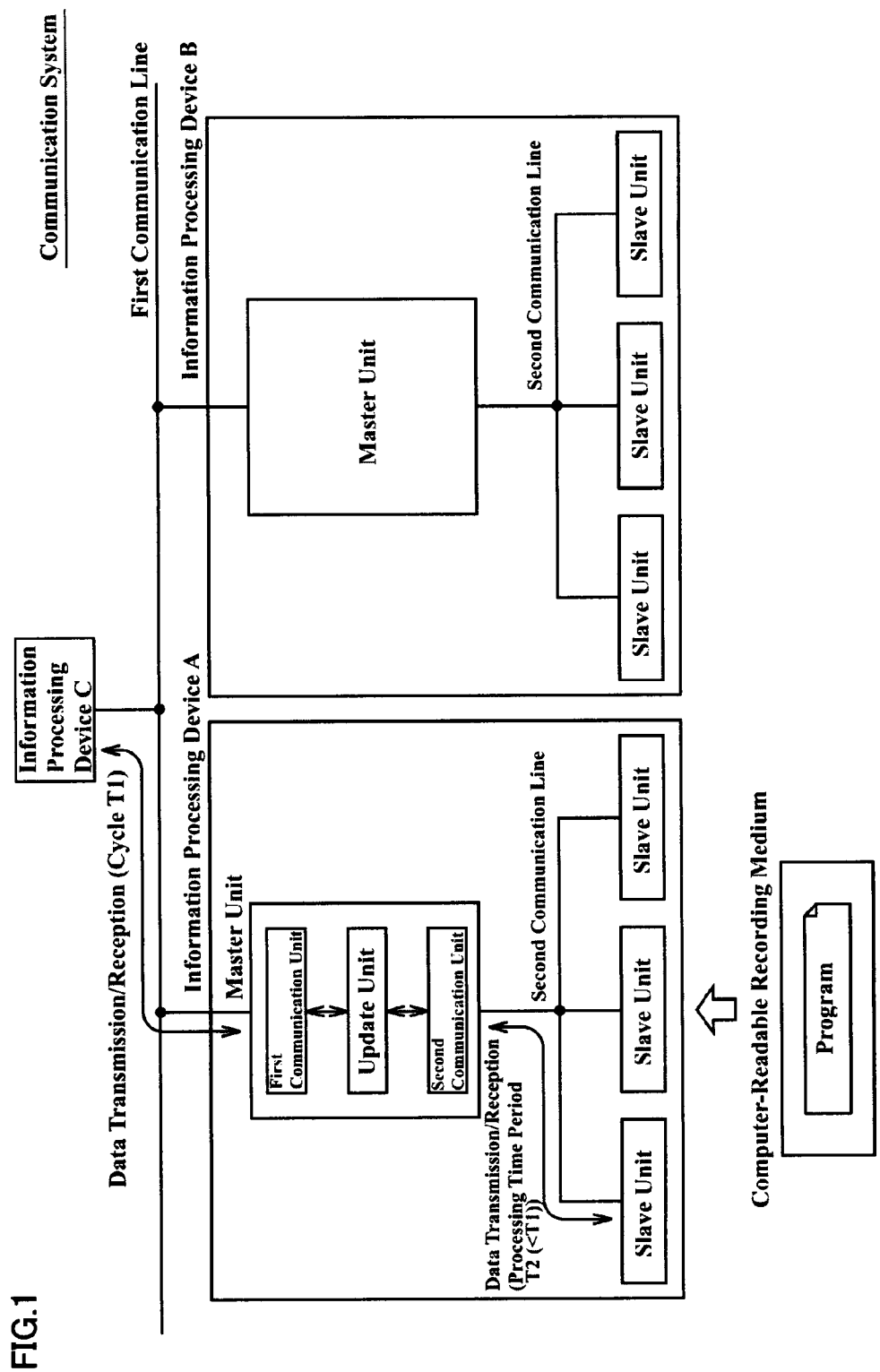
FIG. 1 is a diagram illustrating an outline of the present embodiments.

Embodiments of the present invention will now be described in detail with reference to the drawings. It should be noted that elements in the drawings that are identical or equivalent to one another will be given the same reference sign, and a description thereof will not be repeated.

A. Outline

First, an outline of an information processing device according to the embodiments of the present invention will be described. FIG. 1 is a diagram illustrating an outline of the present embodiments.

FIG. 1 shows an example of a configuration of a communication system including three information processing devices (information processing devices A, B and C). The information processing devices may be any kind of computers. The information processing devices are connected to one another via a first communication line. That is to say, each of the information processing devices A, B and C constitutes at least a part of the communication system.

More specifically, the information processing device A includes a master unit connected to the first communication line, and at least one slave unit connected to the master unit via a second communication line. The master unit exchanges data with another device via the first communication line, and also exchanges data with the slave unit via the second communication line. In relation to these functions, the master unit includes a first communication unit, a second communication unit, and an update unit.

The first communication unit transmits/receives data to/from another device via the first communication line in every predetermined cycle. That is to say, the first communication unit exchanges data with another information processing device (in the example of FIG. 1, the information processing device C) and with various types of devices, not shown, in every cycle T1.

The second communication unit transmits/receives data to/from the slave unit via the second communication line in a time period shorter than the cycle T1 (in the example of FIG. 1, a processing time period T2 (T2<T1)). After preceding data is received via the first communication line, the update unit updates data with the slave unit via the second communication line before arrival of subsequent data corresponding to the next cycle.

That is to say, the second communication unit completes transmission/reception of data to/from the slave unit in a time period shorter than a cycle in which the master unit transmits/receives data to/from another device. In a case where the master unit has transmitted/received data to/from another device at a certain timing, the update unit completes transmission/reception of data to/from the slave unit before arrival of the next timing.

Figure 2:
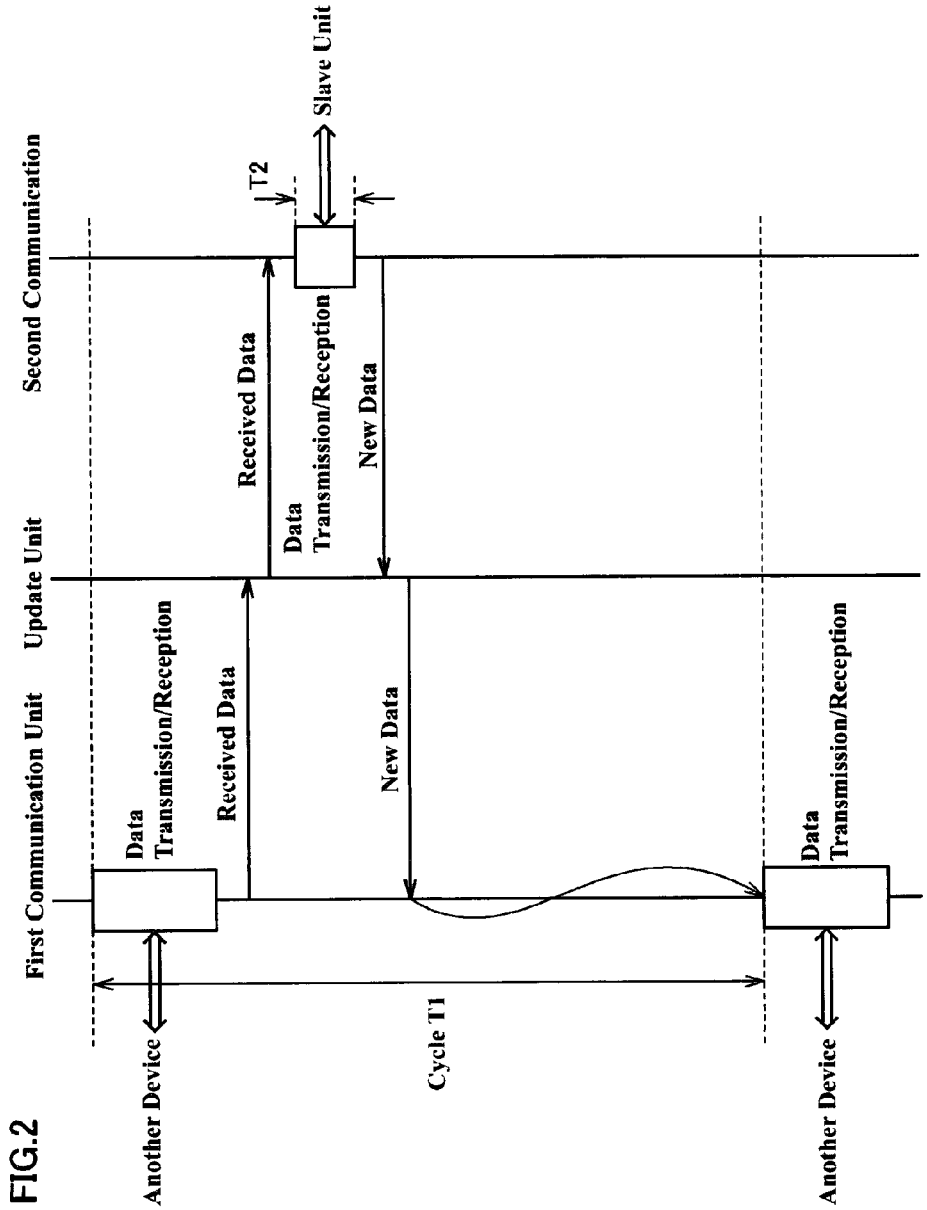
FIG. 2 is a time chart illustrating processing of an information processing device according to the present embodiments.

FIG. 2 is a time chart illustrating processing of the information processing device according to the present embodiments. As shown in FIG. 2, the first communication unit of the information processing device transmits/receives data to/from another device (the information processing device B or C) in every cycle T1. This data transmission/reception includes at least one of data reception from another device and data transmission to another device. That is to say, there are cases in which the first communication unit executes only data reception from another device, or only data transmission to another device.

When the first communication unit receives data, the received data is provided to the second communication unit via the update unit. The second communication unit completes data transmission/reception to/from the slave unit before arrival of the next timing of data transmission/reception by the first communication unit. That is to say, the second communication unit completes data transmission/reception to/from the slave unit in the processing time period T2, which is shorter than the cycle T1.

This data transmission/reception by the second communication unit includes at least one of data reception from the slave unit and data transmission to the slave unit. That is to say, there are cases in which the second communication unit executes only data reception from the slave unit, or only data transmission to the slave unit. When received data is provided via the update unit, the second communication unit transmits the received data to a target slave unit.

Furthermore, when data has been received from the slave unit, the received data is provided to the first communication unit via the update unit as new data. The first communication unit transmits the new data from the slave unit provided via the second communication unit to another device in the next cycle.

By employing such a configuration, data transmitted from another device to the information processing device is provided to the slave unit in a delay time period shorter than the cycle T1. Data transmitted from the first communication unit at a certain timing can reflect data obtained by the slave unit at or after an immediately preceding timing.

Through such processing, data exchanged by the first communication unit with another device at the next timing can be updated to the latest data. This enables more appropriate data update between devices. In addition, data can be provided to the slave unit in a shorter delay time period.

Other information processing devices B and C may also employ a configuration for executing similar processing, or only the information processing device A may employ the above-described configuration. Functions and processing of such an information processing device can also be realized by the information processing device, which is a computer, executing a program. Such a program is stored into any kind of computer-readable recording medium and installed in the computer. For example, an optical recording medium such as a CD-ROM (Compact Disc Read-Only Memory) and a DVD-ROM (Digital Versatile Disc Read-Only Memory), a semiconductor recording medium such as a flash memory, a magnetic recording medium such as a flexible disk, and the like can be used as the computer-readable recording medium. Furthermore, it is permissible to employ a configuration in which the program is distributed via a network.

The program according to the present embodiments can accept a mode in which it uses modules and libraries provided by an OS (Operating System), in addition to a mode in which it includes, for example, a group of all instructions necessary for realizing functions and processing. In this case, the program stored in the computer-readable recording medium does not include the modules and libraries provided by the OS. This case can also be accepted by the program according to the present invention.

The following describes more specific examples of implementation. First to third embodiments and modification examples thereof will discuss a control system for controlling the operations of machines, equipment, and the like as one example of a communication system. More specifically, a control system centering on a PLC will be illustrated. It should be noted that such a control system can employ a configuration centering not only on a PLC, but also on various types of industrial computers. Furthermore, if a new processing device (arithmetic device) is developed through technological advancement, such a new processing device can also be employed. A fourth embodiment and a modification example thereof will discuss a communication system including a general-purpose computer (typically, a personal computer).

A control device serving as one example of an information processing device described in the first to third embodiments basically has at least one output function. This output function is a function of outputting a signal to another device and the like. In principle, a PLC, which is a typical example of the control device, has both of an input function and an output function. This input function is a function of receiving a signal from another device and the like. It should be noted that there are control devices that do not have the input function.

The presence of the input function and the output function is irrelevant to the concept of an information processing device. Therefore, a device that has neither the input function nor the output function could also be considered as an information processing device. However, it is presumed that an information processing device that only has the input function and does not have the output function is not classified as a control device.

B. Overall Configuration of PLC System

Figure 3:
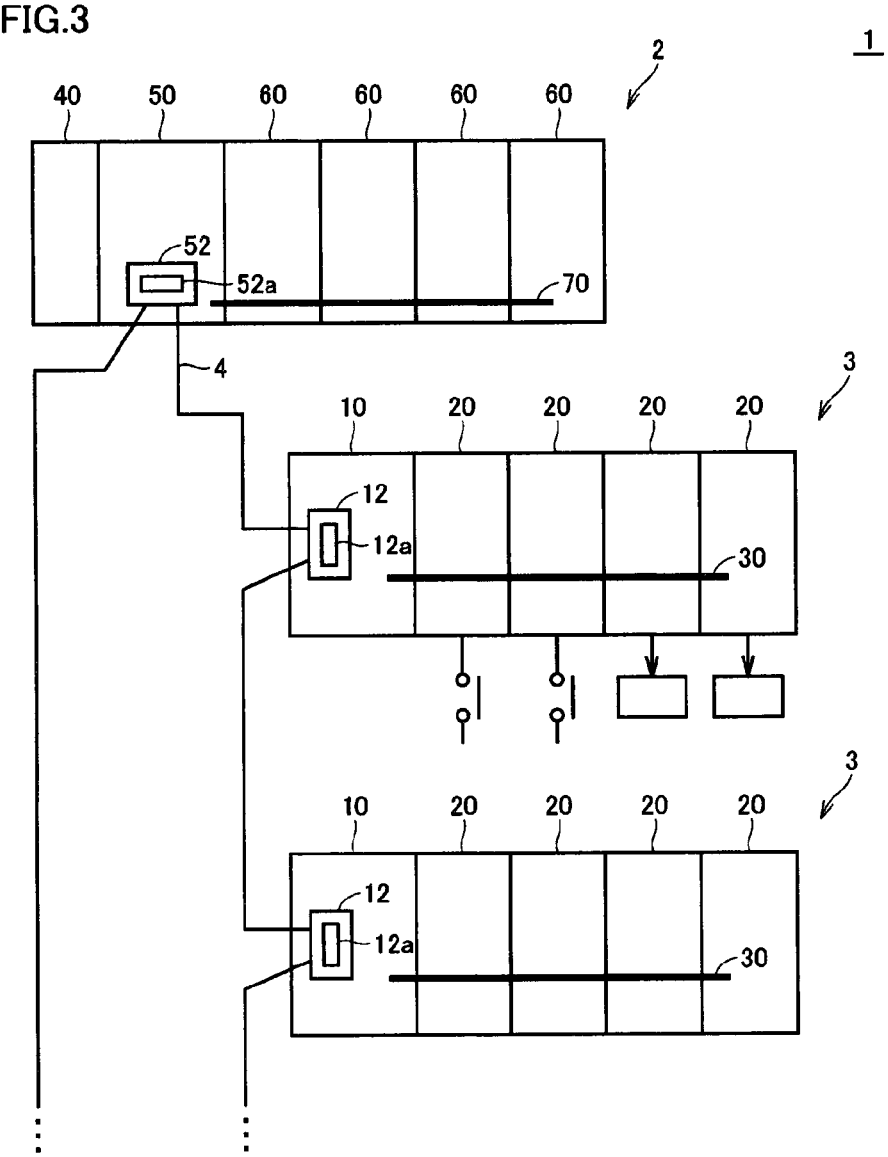
FIG. 3 is a schematic diagram showing an overall configuration of a PLC system according to first to third embodiments.

First, an overall configuration of a PLC system according to the first to third embodiments will be described. FIG. 3 is a schematic diagram showing an overall configuration of a PLC system 1 according to the first to third embodiments of the present invention.

As shown in FIG. 3, the PLC system 1 includes a main processing device 2 and one or more remote JO devices 3. The main processing device 2 is connected to the remote JO devices 3 via a field bus 4 serving as a first communication line. Each of the remote JO devices 3 includes a communication module 12 connected to the field bus 4.

The main processing device 2 executes a control program, and in response to an input signal from an external switch and sensor, generates an output signal to an external relay and actuator.

More specifically, the main processing device 2 includes a power source unit 40, a CPU (Central Processing Unit) unit 50, and IO units 60. The CPU unit 50 and the IO units 60 are connected such that they can perform data communication with one another via an internal bus 70.

The power source unit 40 supplies a power source of an appropriate voltage to the CPU unit 50 and the IO units 60. The CPU unit 50 is a main arithmetic executor including a processor for executing the control program and a main memory. The JO units 60 handle input of signals from the external switch and sensor, as well as output of signals to the external relay and actuator.

The CPU unit 50 includes a communication module 52 for exchanging data with the remote JO devices 3 via the field bus 4. The field bus 4 employs a communication method that enables communication in a predetermined control cycle (that is to say, enables real-time communication). That is to say, it will be assumed that, in the field bus 4, data is updated with all devices connected to the field bus 4 in every predetermined control cycle. In other words, punctuality is guaranteed in the field bus 4 according to the first to third embodiments.

Typically, various types of industrial Ethernet (registered trademark) can be used as such a field bus 4. Known examples of the industrial Ethernet (registered trademark) include EtherCAT (registered trademark), PROFINET (registered trademark), MECHATROLINK (registered trademark)-III, Powerlink, SERCOS (registered trademark)-III, and CIP Motion. Any of these examples may be employed. Furthermore, a field network other than the industrial Ethernet (registered trademark) may be used. For example, DeviceNet, CompoNet/IP (registered trademark), and the like may be used. In the following description, the field bus 4 is assumed to be EtherCAT (registered trademark).

The remote IO devices 3 are control devices that constitute at least a part of the PLC system 1. The remote IO devices 3 receive input signals from an external switch and sensor, transmit the received input signals to the main processing device 2 via the field bus 4, and output signals received from the main processing device 2 via the field bus 4 to an external relay and actuator.

More specifically, the remote IO devices 3 include a master unit 10 and one or more slave units 20. The master unit 10 and the slave units 20 are connected such that they can perform data communication with one another via an internal bus 30. That is to say, the master unit 10 is connected to the field bus 4 serving as the first communication line. One or more slave units 20 are connected to the master unit 10 via the internal bus 30 serving as a second communication line.

The master unit 10 mainly controls the operations of the slave units 20 (e.g., control for an update timing of IO data), and also controls data communication with the main processing device 2. Specifics of the master unit 10 will be described later.

The slave units 20 have a function of general input/output processing, in addition to a function of performing data communication with the master unit 10 via the internal bus 30. Typically, the slave units 20 input/output binarized data such as on/off. For example, the slave units 20 collect, from a detection sensor, information indicating either a state in which some sort of target object is being detected (on), or a state in which no target object is being detected (off). The slave units 20 further provide output destinations such as the relay and the actuator with one of an activating instruction (on) and an inactivating instruction (off).

While the above description has illustrated a configuration in which each of the slave units 20 executes the input/output processing, the slave units 20 may be configured to be specialized in input processing (input units) or in output processing (output units).

C. Outline of Data Update

Next, a description is given of data update via the field bus 4 and via the internal buses 30 of the remote IO devices 3.

Figure 4:
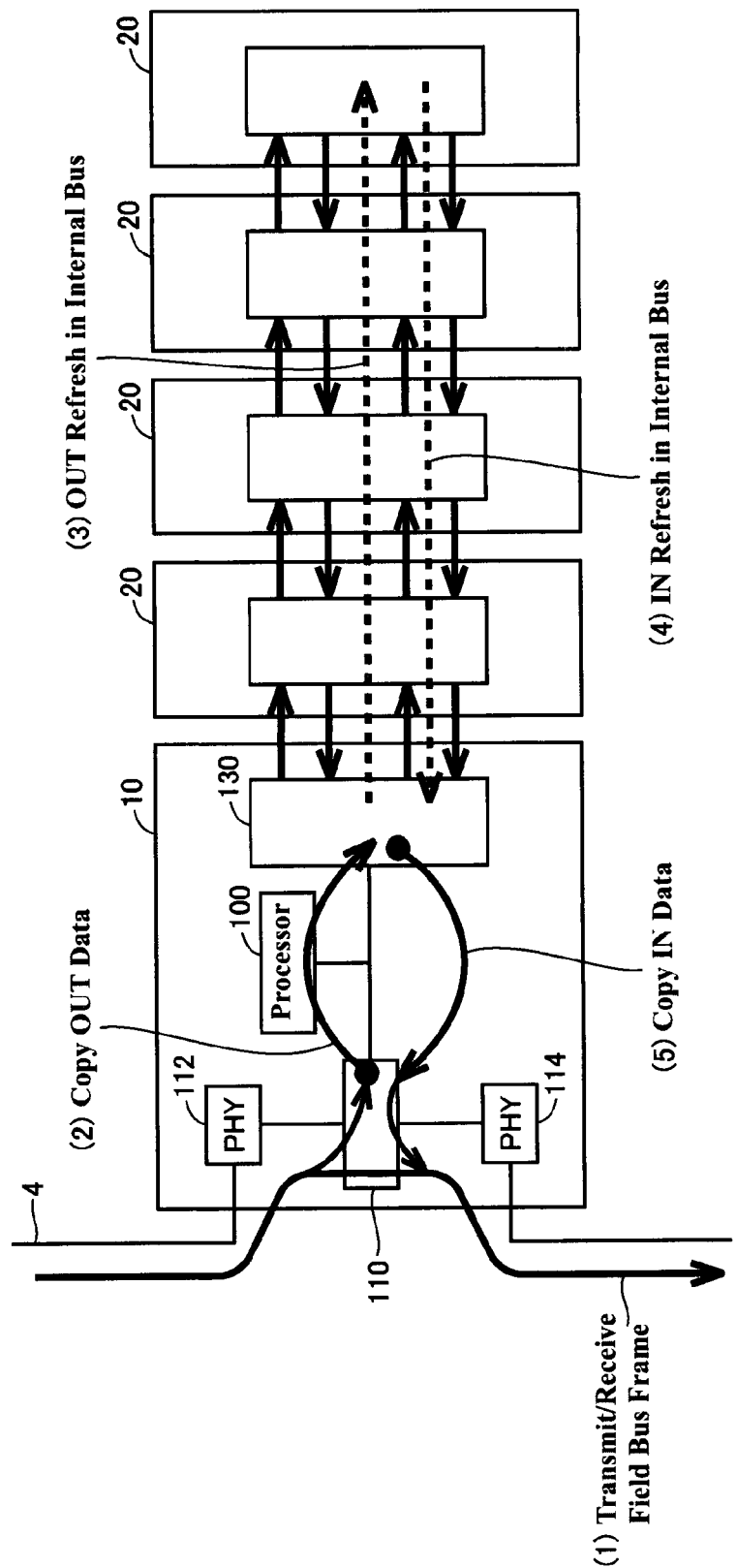
FIG. 4 is a diagram illustrating a procedure of data update in the PLC system according to the first to third embodiments.

FIG. 4 is a diagram illustrating a procedure of data update in the PLC system 1 according to the first to third embodiments. Data update in the PLC system 1 includes processing for transmitting signals from the external switch and sensor (hereinafter also referred to as "IN data"), which are input to the slave units 20 of the remote IO devices 3, to the main processing device 2, and processing for causing the slave units 20 to output values calculated by execution of the control program on the main processing device 2 (hereinafter also referred to as "OUT data").

Hereinafter, update processing for the IN data and the OUT data is also referred to as "IO refresh processing".

As shown in FIG. 4, the master unit 10 includes a reception unit 112 and a transmission unit 114 that respectively receive and transmit data carried over the field bus 4 (hereinafter also referred to as a "field bus frame"), as well as a field bus control unit 110 that controls the reception unit 112 and the transmission unit 114. The master unit 10 further includes an internal bus control unit 130 for controlling data transmission over the internal bus 30. The field bus control unit 110 and the internal bus control unit 130 operate as ordered by the processor 100.

In the first to third embodiments, the main processing device 2 periodically sends out a field bus frame over the field bus 4. Upon receiving the field bus frame from the main processing device 2, each of the remote IO devices 3 reads data addressed to itself (OUT data) included in the frame, writes data that should be transmitted by itself (IN data) into a preallocated area in the frame, and sends out (forwards) the frame again to a device of the next stage.

That is to say, it is preferable that the master unit 10 obtains the latest IN data before receiving a certain field bus frame. This is for reducing a time period of delay in the import of IN data into the main processing device 2. It is also preferable that the master unit 10 practically outputs OUT data included in a certain field bus frame before arrival of the next field bus frame.

FIG. 4 shows a preferred procedure of such IO refresh processing. Specifically, first, the field bus control unit 110 of the master unit 10 obtains OUT data through reception of a field bus frame, and writes IN data into a field bus frame so as to perform a forward operation (procedure (1)). Then, the processor 100 reads the OUT data obtained from a reception buffer of the field bus control unit 110, and stores the OUT data into a transmission buffer of the internal bus control unit 130 (described later) (procedure (2)).

Subsequently, when the processor 100 activates a transfer table of the field bus control unit 110, the field bus control unit 110 executes OUT refresh by sending out the frame including the OUT data (hereinafter also referred to as an "OUT frame") over the internal bus 30 (procedure (3)). Upon receiving the OUT frame, each of the slave units 20 updates output of signals in accordance with data allocated to itself among the OUT data.

Subsequently, when the processor 100 activates the transfer table of the field bus control unit 110, the field bus control unit 110 executes IN refresh by sending out a frame including a command requesting IN data (hereinafter referred to as an "IN frame") over the internal bus 30 (procedure (4)). Upon receiving the IN frame, each of the slave units 20 updates a signal being input from the outside, and sends out the updated IN data to the master unit 10. The IN data sent out from each of the slave units 20 is stored into a reception buffer 164 of the internal bus control unit 130.

After the IN refresh, the processor 100 reads the IN data from the reception buffer of the internal bus control unit 130, and stores the IN data into a transmission buffer of the field bus control unit 110 (procedure (5)). Then, when a new field bus frame arrives, the above-described processing of procedure (1) is executed repeatedly.

The remote IO devices 3 according to the first to third embodiments optimize execution timings of the IN refresh and the OUT refresh in consideration of a control cycle of a field bus frame included in the IO refresh processing shown in FIG. 4. In this way, an amount of delay in the update of IN data necessary for the execution of the control program on the main processing device 2, as well as an amount of delay in the output of OUT data calculated through the execution of the control program, is reduced to the largest extent possible.

D. Hardware Configuration of Remote IO Devices 3

Figure 5:
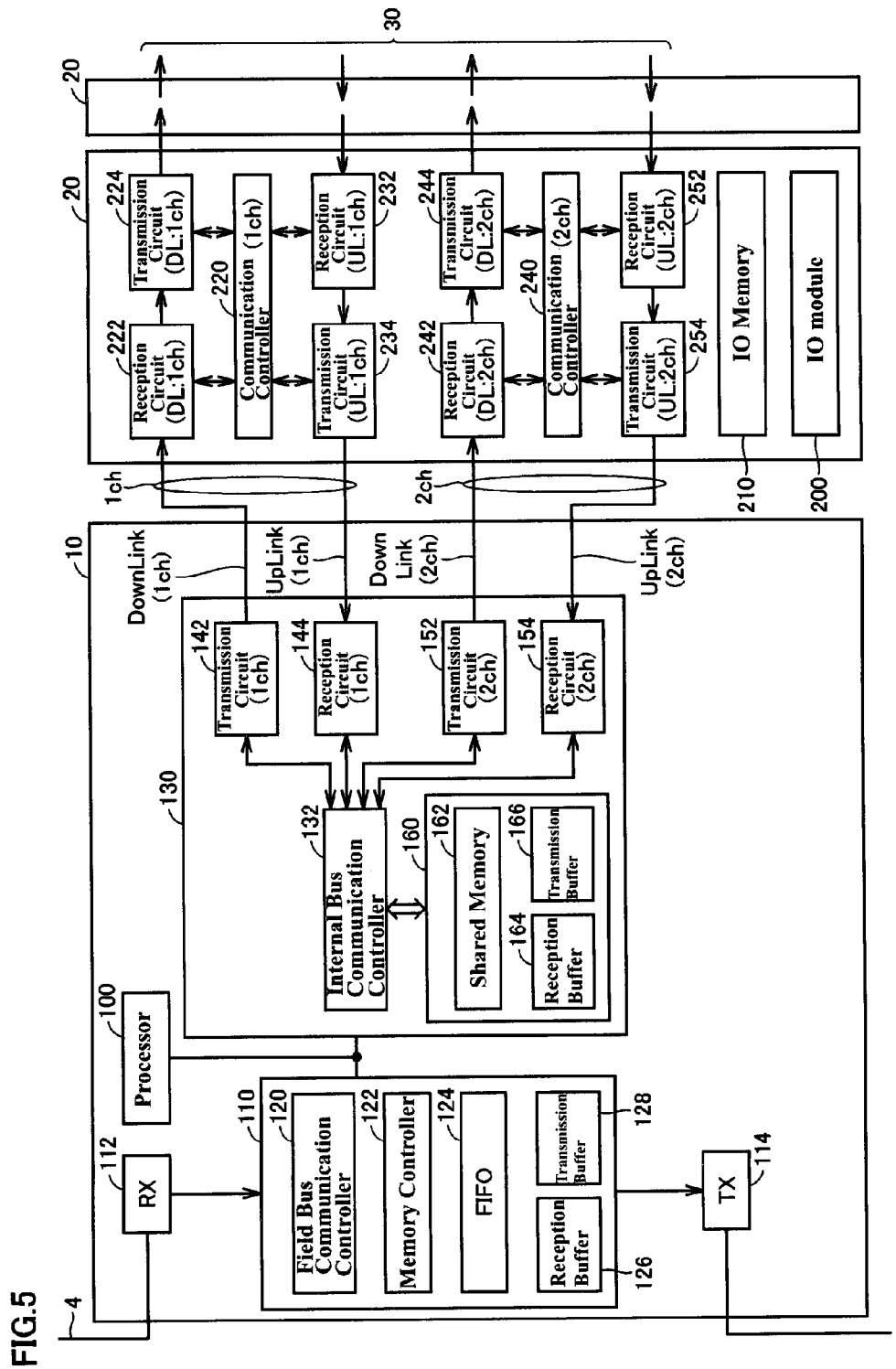
FIG. 5 is a schematic diagram showing a hardware configuration of remote IO devices according to the first to third embodiments.

Next, a description is given of a hardware configuration of the remote IO devices 3. FIG. 5 is a schematic diagram showing a hardware configuration of the remote 10 devices 3 according to the first to third embodiments. It is preferable that components of the master units 10 and the slave units 20 constituting the remote 10 devices 3 each realize, for example, hardware such as an ASIC (Application Specific Integrated Circuit) and an FPGA (Field-Programmable Gate Array) to increase a processing speed. It should be noted that a part of all of the components may be realized by processors executing a program.

<<d1: Configuration of Master Unit 10>>

As shown in FIG. 5, the master unit 10 of the remote IO device 3 includes the processor 100, the field bus control unit 110, the reception unit 112, the transmission unit 114, and the internal bus control unit 130.

The reception unit 112 receives a field bus frame transmitted from the main processing device 2 via the field bus 4, decodes the field bus frame into a data sequence, and outputs the data sequence to the field bus control unit 110. The transmission unit 114 composes a field bus frame from a data sequence output from the field bus control unit 110, and sends out (forwards) the field bus frame via the field bus 4 again.

In coordination with the reception unit 112 and the transmission unit 114, the field bus control unit 110 transmits/receives data to/from another device (in the present example, the main processing device 2 and another remote IO device 3) via the field bus 4 in every predetermined control cycle (hereinafter, a "control cycle T1"). More specifically, the field bus control unit 110 includes a field bus communication controller 120, a memory controller 122, a FIFO (First In First Out) memory 124, a reception buffer 126, and a transmission buffer 128.

The field bus communication controller 120 interprets, for example, a command transmitted from the main processing device 2 via the field bus 4, and executes processing necessary for realizing communication via the field bus 4. The field bus communication controller 120 also executes processing for copying data from field bus frames that are sequentially stored into the FIFO memory 124, and for writing data into the field bus frames.

The memory controller 122 is a control circuit that realizes functions of a DMA (Direct Memory Access) and the like, and controls writing/reading of data into/from the FIFO memory 124, the reception buffer 126, the transmission buffer 128, and the like.

The FIFO memory 124 temporarily stores field bus frames received via the field bus 4, and sequentially outputs the field bus frames in accordance with the order in which they have been stored. The reception buffer 126 extracts necessary IN data from data included in field bus frames sequentially stored into the FIFO memory 124, and temporarily stores the IN data. The transmission buffer 128 temporarily stores OUT data that is included in field bus frames sequentially stored into the FIFO memory 124 and that should be written into an area allocated to the device in which the transmission buffer 128 is included. That is to say, the FIFO memory 124, the reception buffer 126, and the transmission buffer 128 are equivalent to a buffer memory for storing data transmitted over the field bus 4.

The processor 100 issues orders to the field bus control unit 110 and the internal bus control unit 130, and controls, for example, data transfer between the field bus control unit 110 and the internal bus control unit 130. That is to say, the processor 100 also functions as a transfer circuit for controlling data transfer between a buffer memory of the field bus control unit 110 and a buffer memory of the internal bus control unit 130.

The internal bus 30 between the master unit 10 and the slave units 20 is constituted by a communication channel made up of a pair of a downlink and an uplink. While FIG. 5 shows an example of a configuration in which this communication channel is provided for two lines (1ch and 2ch), this communication channel may be provided for one line, or many more lines may be provided.

The internal bus control unit 130 transmits/receives data to/from the slave units 20 via the internal bus 30 in a time period shorter than the control cycle (the control cycle T1) in the field bus 4. For example, the control cycle T1 is set to 125 µs, and a time period required for data transmission between the master unit 10 and the slave units 20 via the internal bus 30 is several µs to approximately a dozen µs.

More specifically, the internal bus control unit 130 includes an internal bus communication controller 132, transmission circuits 142, 152, reception circuits 144, 154, and a storage unit 160.

The internal bus communication controller 132 serves as a main manager of data communication via the internal bus 30 (that is to say, as a master). For example, the internal bus communication controller 132 executes IN refresh or OUT refresh by sending out an IN frame or an OUT frame over the internal bus 30 as ordered by the processor 100. This IN frame or OUT frame may be sent out to a specific slave unit 20 on an individual basis, or may be simultaneously sent out to all of the slave units 20 connected to the internal bus 30.

The transmission circuit 142 generates and sends out a frame for a downlink (1ch) of the internal bus 30 as ordered by the internal bus communication controller 132. The reception circuit 144 receives a frame carried over an uplink (1ch) of the internal bus 30, and outputs the frame to the internal bus communication controller 132. The transmission circuit 152 and the reception circuit 154 execute similar processing respectively for a downlink (2ch) and an uplink (2ch) of the internal bus 30.

The storage unit 160 is equivalent to a buffer memory for storing data transmitted over the internal bus 30. More specifically, the storage unit 160 includes a shared memory 162, a reception buffer 164, and a transmission buffer 166. The shared memory 162 temporarily stores data exchanged between the field bus control unit 110 and the internal bus control unit 130. The reception buffer 164 temporarily stores IN data received from the slave units 20 via the internal bus 30. The transmission buffer 166 temporarily stores OUT data included in a field bus frame received by the field bus control unit 110.

<<d2: Configuration of Slave Units 20>>

As shown in FIG. 5, each of the slave units 20 in the remote IO device 3 includes an IO module 200 and an IO memory 210. Each of the slave units 20 further includes a communication controller 220, reception circuits 222, 232, and transmission circuits 224, 234 that are associated with 1ch of the internal bus 30. Each of the slave units 20 further includes a communication controller 240, reception circuits 242, 252, and transmission circuits 244, 244 that are associated with 2ch of the internal bus 30.

The IO module 200 receives an input signal from the external switch and sensor, and writes a value thereof into the IO memory 210. The IO module 200 also outputs a signal to the external relay and actuator in accordance with a value written in a corresponding area of the IO memory 210. That is to say, the IO module 200 includes at least one of an input unit for collecting a state value of an externally input signal (IN data) and an output unit for outputting a signal of a designated state value (OUT data).

The reception circuit 222 receives a frame carried over the downlink (1ch) of the internal bus 30, decodes the frame into a data sequence, and outputs the data sequence to the transmission circuit 224 and the communication controller 220. The transmission circuit 224 regenerates a frame carried over the downlink (1ch) of the internal bus 30 from the data sequence from the reception circuit 222 and sends out (forwards) the frame again as ordered by the communication controller 220.

The reception circuit 232 receives a frame carried over the uplink (1ch) of the internal bus 30, decodes the frame into a data sequence, and outputs the data sequence to the transmission circuit 234 and the communication controller 220. The transmission circuit 234 regenerates a frame carried over the uplink (1ch) of the internal bus 30 from the data sequence from the reception circuit 232 and sends out (forwards) the frame again as ordered by the communication controller 220.

The communication controller 220 interprets, for example, a command included in the data sequence (frame) from the reception circuit 222 or the reception circuit 232, and executes corresponding processing.

The communication controller 240, the reception circuits 242, 252, and the transmission circuits 244, 254 execute processing similar to processing of the communication controller 220, the reception circuits 222, 232, and the transmission circuits 224, 234, respectively, for 2ch of the internal bus 30.

E. OUT Refresh and IN Refresh

The following describes OUT refresh and IN refresh in the internal buses 30 of the remote IO devices 3.

Figure 6:
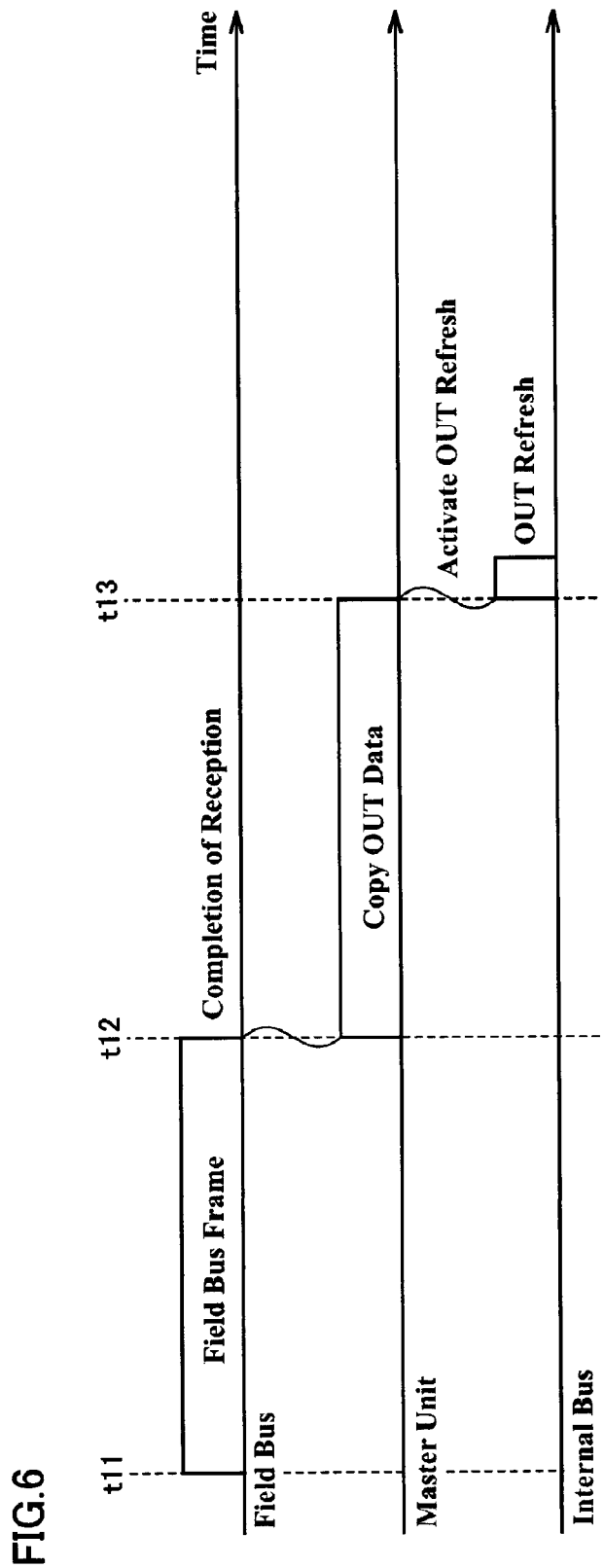
FIG. 6 is a time chart showing one example of operations of OUT refresh in the remote IO devices according to the first to third embodiment.
Figure 7:
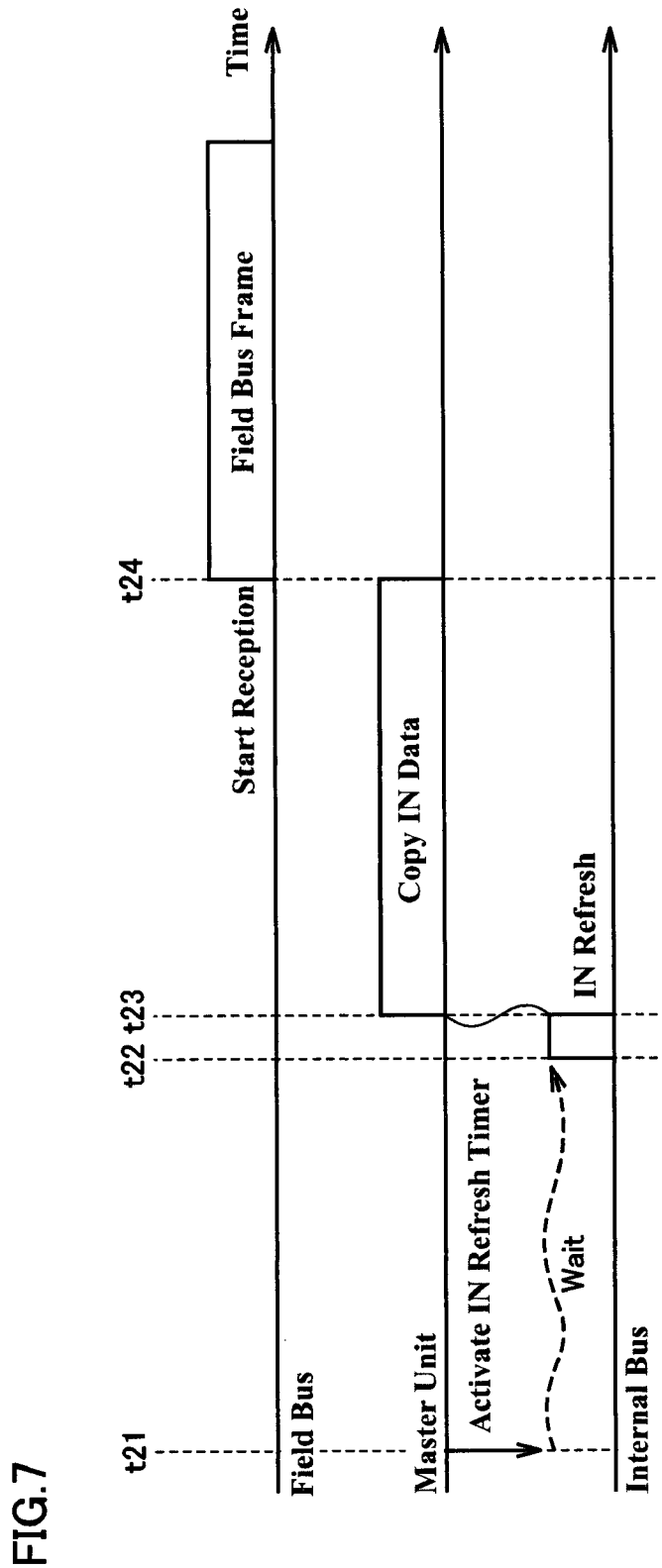
FIG. 7 is a time chart showing one example of operations of IN refresh in the remote IO devices according to the first to third embodiment.

FIG. 6 is a time chart showing one example of operations of the OUT refresh in the remote IO devices 3 according to the first to third embodiment. FIG. 7 is a time chart showing one example of operations of the IN refresh in the remote IO devices 3 according to the first to third embodiment.

As shown in FIG. 6, the OUT refresh is started at a timing of completion of reception of a field bus frame. That is to say, provided that a start of the field bus frame arrives at time t11 and reception of the entire field bus frame is completed at time t12, the processor 100 starts to copy (transfer) OUT data stored in the reception buffer 126 of the field bus control unit 110 to the transmission buffer 166 of the internal bus control unit 130 from time t12. Then, when this copy processing for the OUT data is completed at time t12, the internal bus control unit 130 starts to send out an OUT frame including the OUT data to the slave units 20 via the internal bus 30. In the first to third embodiments, the internal bus 30 has a higher carrier frequency than the field bus 4, and therefore it takes a small amount of time to end this sending of the OUT frame compared to copy processing for a field bus frame and OUT data.

Upon receiving the OUT frame, each of the slave units 20 extracts OUT data allocated to itself from the OUT data included in the received OUT frame, and updates a state value to be output. That is to say, the processor 100 and the internal bus controller 130 of the remote IO device 3 update signals output from the output units of the slave units 20 in accordance with at least a part of OUT data received via the field bus 4 as update processing.

As shown in FIG. 7, the IN refresh is executed in time for a start timing of copy (transfer) of IN data stored in the reception buffer 126 of the field bus control unit 110 to the transmission buffer 166 of the internal bus control unit 130 for a subsequent field bus frame. That is to say, after a preceding field bus frame is received via the field bus 4, IN data is updated with the slave units 20 via the internal bus 30 before arrival of a subsequent field bus frame corresponding to the next control cycle. In this way, the processor 100 and the internal bus control unit 130 of the remote IO device 3 cause the input units of the slave units 20 to newly collect state values and transmit the collected state values (IN data) to the master unit 10 as update processing.

As a specific method, the processor 100 may predetermine a timing at which IN refresh should be started on the basis of a timing of arrival of a subsequent field bus frame corresponding to the next control cycle, and start the IN refresh by activating the internal bus control unit 130 at the determined timing.

Alternatively, the processor 100 may notify the internal bus control unit 130 of activation time (that is to say, a start timing of the IN refresh is started) in advance using a timer activation function of the internal bus control unit 130. FIG. 7 shows an example in which the timer activation function is used. By using such a timer activation function, the activation time can be set more accurately.

More specifically, at time t21, the processor 100 causes the internal bus control unit 130 to activate a timer that manages the start timing of the IN refresh. It is sufficient for an activation timing of the timer to take place any time before the time at which the IN refresh should be started. In the example of FIG. 7, the timer is activated with designation of time t22 as the time at which the IN refresh should be started. The timing is designated such that the IN refresh is completed before the start of the copy (transfer) of IN data stored in the reception buffer 164 of the internal bus control unit 130 to the transmission buffer 128 of the field bus control unit 110 (time t23).

When the subsequent field bus frame arrives at time t24, the updated IN data stored in the transmission buffer 128 of the field bus control unit 110 is written to this field bus frame and sent out (forwarded) again to a device of the next stage.

In this way, after a preceding field bus frame is received via the field bus 4, the processor 100 and the internal bus control unit 130 of the remote 10 device 3 update IN data with the slave units 20 via the internal bus 30 before arrival of a subsequent field bus frame.

F. First Embodiment

The following illustrates an embodiment suited for a configuration in which a bandwidth of the internal bus 30 is relatively narrow and the effects of noise can be ignored as a first embodiment.

<<f1: Overview>>

Figure 8:
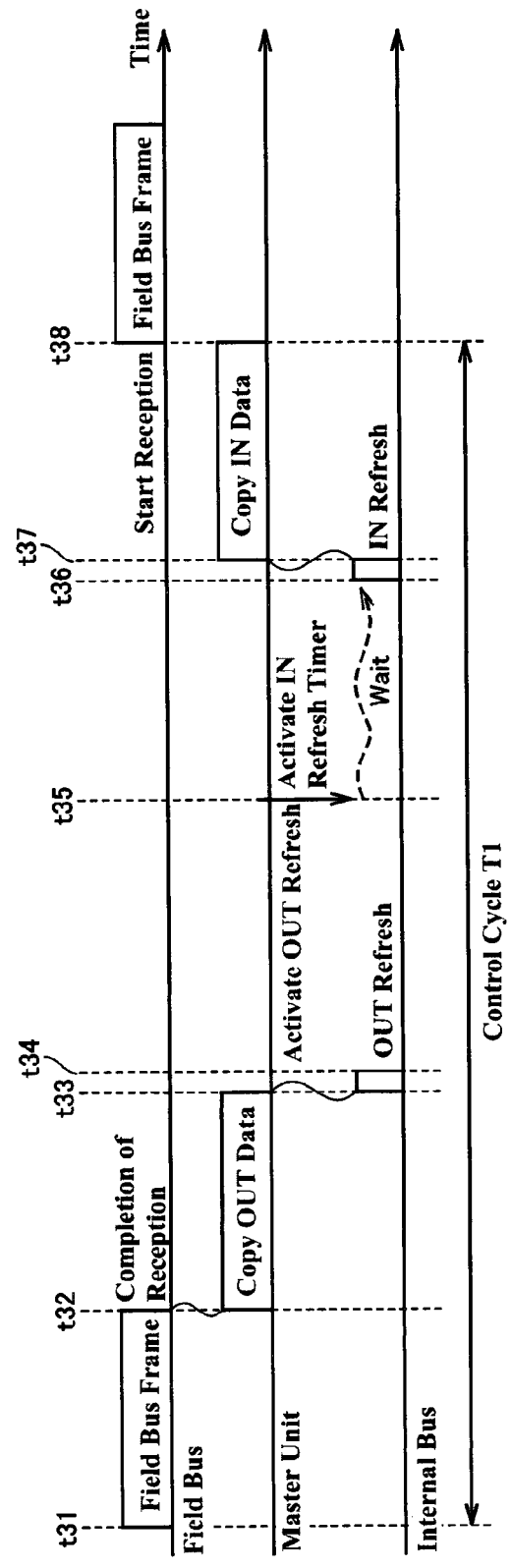
FIG. 8 is a time chart showing one example of operations of OUT/IN refresh in the remote IO devices according to the first embodiment.

FIG. 8 is a time chart showing one example of operations of OUT/IN refresh in the remote 10 devices 3 according to the first embodiment.

In the time chart shown in FIG. 8, after completion of reception of a field bus frame, the master unit 10 executes OUT refresh by starting to send out OUT data via the internal bus 30. On the other hand, collection of IN data from the slave units 20 is started in time for a start of copy processing for the IN data (for writing the IN data at the time of reception of a subsequent field bus frame). That is to say, the master unit 10 activates a timer to start to send out an IN frame over the internal bus 30.

More specifically, assume that a start of a preceding field bus frame arrives at time t31. Also assume that reception of this preceding field bus frame is completed at time t32. At time t32, the processor 100 starts to copy (transfer) OUT data stored in the reception buffer 126 of the field bus control unit 110 to the transmission buffer 166 of the internal bus control unit 130. Then, upon completion of this copy processing for the OUT data at time t33, the internal bus control unit 130 subsequently executes the OUT refresh by sending out an OUT frame including the OUT data over the internal bus 30.

That is to say, the processor 100 and the internal bus control unit 130 start update processing for the output units of the slave units 20 (that is to say, the OUT refresh) after the reception of the preceding field bus frame, as well as the subsequent transfer of the field bus frame (to be more precise, the OUT data included therein) from the reception buffer 126 of the field bus control unit 110 to the transmission buffer 166 of the internal bus control unit 130, is completed.

It is assumed that this OUT refresh is completed at time t34. Thereafter, at time t35, the processor 100 activates a timer (an IN refresh timer) that determines a start timing of IN refresh using the timer activation function of the internal bus control unit 130. When the IN refresh timer ends at time t36, the internal bus control unit 130 executes the IN refresh by sending out an IN frame over the internal bus 30. Upon receiving the IN frame via the internal bus 30, each of the slave units 20 refreshes the IO module 200 and sends out a state value (IN data) of the IO memory 210 that is updated accordingly to the master unit 10 via the internal bus 30.

At time t37, the processor 100 starts to copy (transfer) the IN data stored in the reception buffer 164 of the internal bus control unit 130 to the transmission buffer 128 of the field bus control unit 110. In the first embodiment, control is performed such that the IN refresh is completed by time t37. When the subsequent field bus frame arrives at time t38, the field bus control unit 110 writes the IN data into the field bus frame that has arrived.

An interval from time t31 to time t38 is equivalent to the control cycle T1 in the field bus 4. As the control cycle T1 in the field bus 4 is predetermined (typically, the main processing device 2 gives notice thereof), time t38, that is to say, an arrival timing of the subsequent field bus frame can be identified as long as time t31 can be identified. Therefore, based on information of these timings, the processor 100 can determine the activation timing of the timer for setting the start of the IN refresh (in FIG. 8, time t35) and a timer value thereof. That is to say, the internal bus control unit 130 starts update processing for the input units of the slave units 20 from a time point (in FIG. 8, time t36) that precedes a time point (time t38) at which the subsequent field bus frame corresponding to the next control cycle is supposed to arrive by a predetermined time period.

In other words, the processor 100 starts the update processing for the input units of the slave units 20 (the IN refresh) such that storage of state values (IN data) collected by the input units of the slave units 20 into the reception buffer 164 of the internal bus control unit 130, as well as subsequent data transfer from the internal bus control unit 130 to the transmission buffer 128 of the field bus control unit 110, is completed before arrival of the subsequent field bus frame.

<<f2: Determination of Timings>>

In order to secure punctuality in the field bus 4, if the main processing device 2 has notified each of devices connected to the field bus 4 of a reference timing, the time to start the IN refresh timer (in FIG. 8, time t36) can be identified based on the reference timing. Alternatively, time t36 may be determined based on a timing at which the preceding field bus 4 was received (in FIG. 8, time t31) and on the control cycle T1.

More specifically, referring back to FIG. 3, the main processing device 2 includes a timer (a timer 52a included in the communication module 52) that is shared with the remote IO devices 3 connected via the field bus 4. This timer is synchronized with timers 12a included in the communication modules 12 of the respective remote IO devices 3. It should be noted that the timers may also be counters that perform countup/countdown in a predetermined cycle instead of indicating time.

The processors 100 of the remote IO devices 3 determine the start timing of the IN refresh based on a value measured by these synchronized timers (typically, counted values). That is to say, the processors 100 determine time t35 and time t36 shown in FIG. 8 based on the timers.

G. Second Embodiment

The following illustrates an embodiment suited for a configuration that has improved tolerance for noise compared to the first embodiment described above as a second embodiment.

<<g1: Basic Form>>

Figure 9:
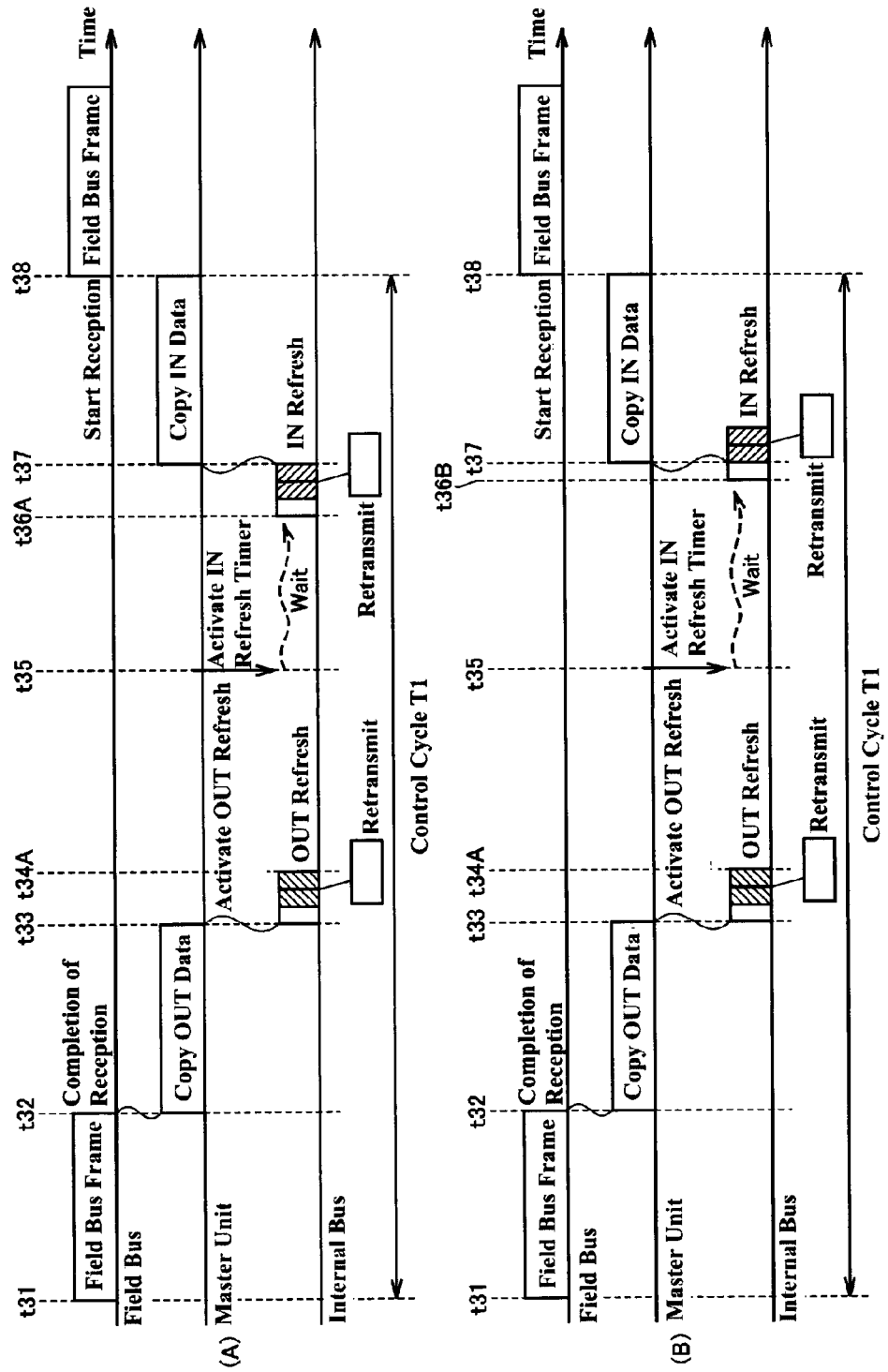
FIG. 9 is a time chart showing examples of operations of OUT/IN refresh in the remote IO devices according to the second embodiment.

FIG. 9 is a time chart showing examples of operations of OUT/IN refresh in the remote IO devices 3 according to the second embodiment.

As shown in FIG. 9(A), in the second embodiment, at least one of the OUT refresh and the IN refresh is executed multiple times. Such execution takes into consideration a case in which at least one of an OUT frame and an IN frame is not accurately transmitted due to, for example, the effect of noise. The slave units 20 can complete the OUT refresh and the IN refresh as long as they can receive at least one OUT frame and one IN frame among the OUT frames and the IN frames targeted for multiple transmissions.

It is permissible to employ a configuration in which destination units return whether or not they have accurately received OUT frames and IN frames using positive/negative responses (ACK/NACK) and the like. However, processing can be further simplified by employing a method for retransmitting an OUT frame and an IN frame a predetermined number of times regardless of whether or not the destinations are capable of reception, as in the second embodiment.

While FIG. 9(A) shows an example in which OUT refresh (an OUT frame) and IN refresh (an IN frame) are retransmitted twice each, the number of retransmissions may be determined in accordance with pre-evaluated performance related to tolerance for noise. Alternatively, a user may set the number of retransmissions in any suitable manner.

In this way, in the second embodiment, the processor 100 orders transmission of state values (IN data) collected by the slave units 20 to the master unit 10 multiple times by retransmitting the IN frame. The processor 100 also transmits an instruction for updating signals (OUT data) output by the output units of the slave units 20 multiple times by retransmitting the OUT frame.

In the second embodiment, the IN frame is transmitted multiple times, and therefore a timing for starting to send out the IN frame is further advanced. That is to say, in consideration of retransmitted frames, a value of the timer that manages the start timing of the IN refresh is set such that the IN refresh is started at an earlier timing. In this way, even if the IN refresh is executed through a subsequent IN frame instead of the first IN frame, the IN refresh is executed in time for the start of copy (transfer) of OUT data stored in the reception buffer 126 of the field bus control unit 110 to the transmission buffer 166 of the internal bus control unit 130. That is to say, the IN data can be written into a field bus frame in the next control cycle.

<<g2: Effects of Noise>>

Next, the effects of noise in the internal bus 30 will be described.

FIG. 9(B) shows an example in which a start timing of IN refresh is set in a manner similar to the first embodiment described above in a case where the IN refresh is executed multiple times, that is to say, an IN frame is retransmitted. In this case, if the IN refresh is completed through the first IN frame, originally intended processing can be executed. That is to say, the IN data can be written into a field bus frame in the next control cycle. However, if the IN refresh is completed through the second or subsequent IN frame due to the actual occurrence of noise, the IN data is written into a field bus frame in a control cycle next to the next control cycle. That is to say, in the next control cycle, existing IN data is written into a field bus frame.

For this reason, in a case where the internal bus 30 has a relatively wide bandwidth and is easily affected by noise, it is preferable to execute the IN refresh multiple times and start the execution of the IN refresh at an earlier timing, as shown in FIG. 9(A).

<<g3: Limit of Retransmissions>>

Figure 10:
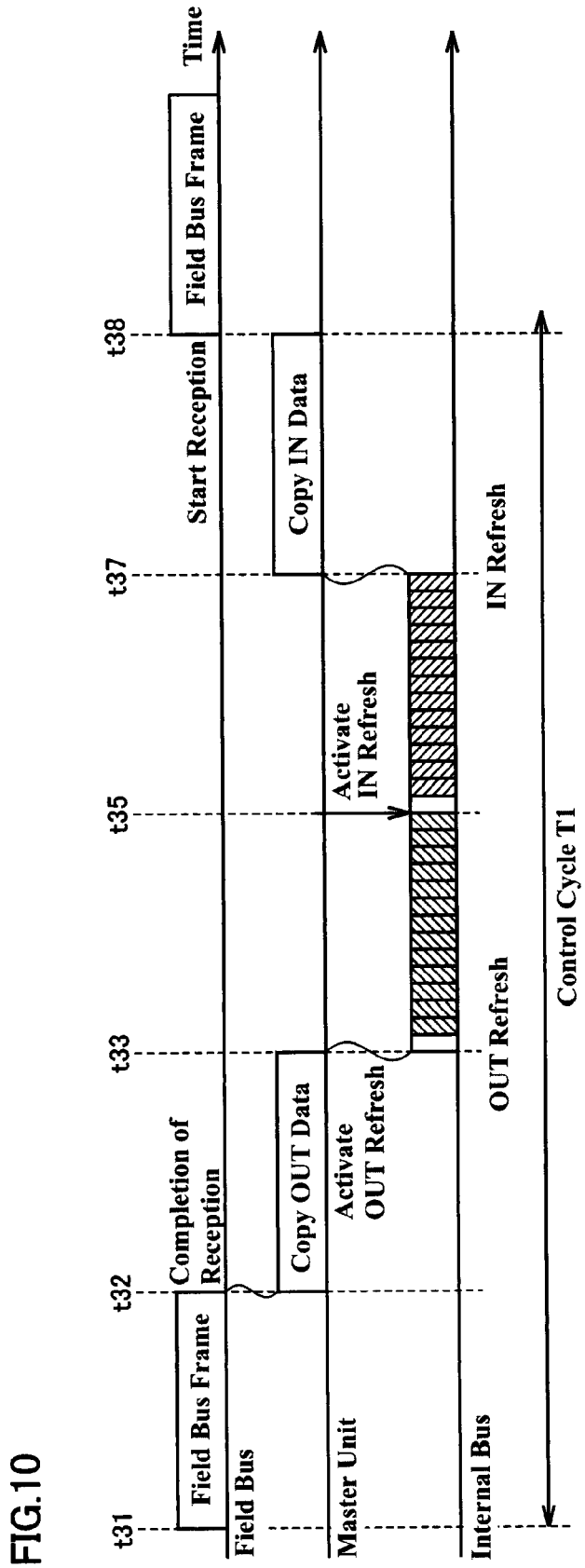
FIG. 10 is a time chart showing a limit of retransmissions in the operations of the OUT/IN refresh shown in FIG. 9.

FIG. 10 is a time chart showing a limit of retransmissions in the operations of the OUT/IN refresh shown in FIG. 9. The time chart of FIG. 10 shows an example in which the number of retransmissions of the OUT refresh and the IN refresh has been maximized. The limit of the number of retransmissions of an OUT frame and an IN frame (that is to say, a maximum time period that can be allocated to transmission of the OUT frame and the IN frame over the internal bus 30) can be calculated in accordance with the following expression.

Control cycle−(length of field bus frame+time period required to copy OUT data+time period required to copy IN data)

It should be noted that, as it takes time (budget) to generate the OUT frame and the IN frame, the actual maximum value of the number of retransmissions is determined in consideration of such an overhead.

H. Third Embodiment

The following illustrates a configuration in which copy processing for IN data and OUT data in the master unit 10 is executed in parallel with OUT refresh and IN refresh over the internal bus 30 as a third embodiment.

<<h1: Basic Form>>

Figure 11:
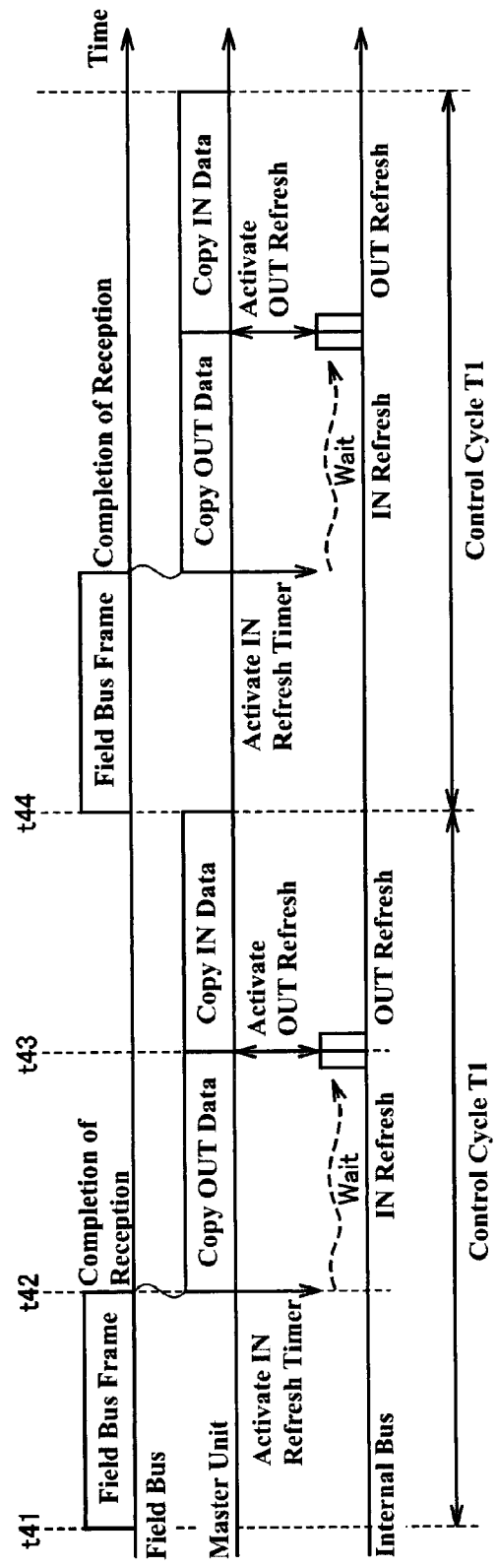
FIG. 11 is a time chart showing one example of operations of OUT/IN refresh in the remote IO devices according to the third embodiment.

FIG. 11 is a time chart showing one example of operations of OUT/IN refresh in the remote IO devices 3 according to the third embodiment. In the example shown in FIG. 11, after OUT data stored in the reception buffer 126 of the field bus control unit 110 is copied (transferred) to the transmission buffer 166 of the internal bus control unit 130, copy (transfer) of IN data stored in the reception buffer 164 of the internal bus control unit 130 to the transmission buffer 128 of the field bus control unit 110 is executed subsequently. Therefore, a start timing of the IN refresh is determined so as to make it in time for a start of this copy of the IN data.

More specifically, assume that a start of a preceding field bus frame arrives at time t41, and reception of this preceding field bus frame is completed at time t42. At time t42, the processor 100 starts to copy (transfer) OUT data stored in the reception buffer 126 of the field bus control unit 110 to the transmission buffer 166 of the internal bus control unit 130. When this copy processing for the OUT data is completed at time t43, the processor 100 subsequently starts to copy (transfer) the IN data stored in the reception buffer 164 of the internal bus control unit 130 to the transmission buffer 128 of the field bus control unit 110. Then, the next field bus frame arrives at time t44.

In parallel with the foregoing copy operation, the internal bus control unit 130 executes the OUT refresh by sending out an OUT frame including the OUT data over the internal bus 30 at time t43.

At the same time with the start of the copy of the OUT data (time t42), the processor 100 also causes the internal bus control unit 130 to activate the timer that manages the start timing of the IN refresh. At this time, a timing for starting to send out an IN frame over the internal bus 30 is determined so as to make it in time for a start of copy processing for the IN data (time t43).

In this way, in the third embodiment, the processor 100 executes update processing for the input units of the slave units 20 (the IN refresh) in parallel with transfer of data (OUT data) from the reception buffer 126 of the field bus control unit 110 to the transmission buffer 166 of the internal bus control unit 130. Along with this, the processor 100 executes update processing for the output units of the slave units 20 (the OUT refresh) in parallel with transfer of state values (the IN data) collected by the input units of the slave units 20 from the reception buffer 164 of the internal bus control unit 130 to the transmission buffer 128 of the field bus control unit 110.

By employing a method described in the third embodiment, a control cycle in a field bus 4 can be further shortened. That is to say, a minimum value of the control cycle in the field bus 4 can be calculated in accordance with the following expression.

Minimum value of control cycle=length of field bus frame+time period required to copy OUT data+ time period required to copy IN data <<h2: Type of Retransmissions>>

In the operations of the OUT/IN refresh shown in FIG. 11, at least one of the OUT refresh and the IN refresh may be executed multiple times as shown in FIG. 9 described above.

Figure 12:
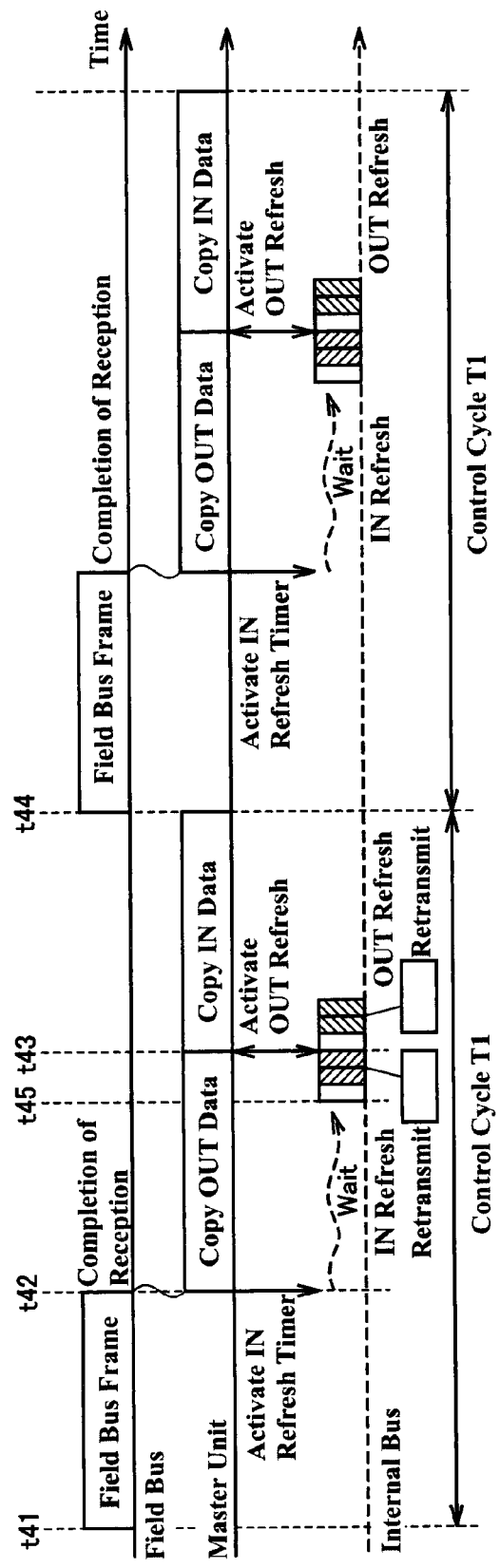
FIG. 12 is a time chart showing one example of operations of OUT/IN refresh in the remote IO devices according to a modification example of the third embodiment.

FIG. 12 is a time chart showing one example of operations of OUT/IN refresh in the remote IO devices 3 according to a modification example of the third embodiment. While FIG. 12 shows an example in which OUT refresh (an OUT frame) and IN refresh (an IN frame) are retransmitted twice each, the number of retransmissions may be determined in accordance with pre-evaluated performance related to tolerance for noise. Alternatively, the user may set the number of retransmissions in any suitable manner.

In this case also, it is preferable that a timing for starting to send out the IN frame is further advanced similarly to the case of FIG. 10. A timing for starting to send out the IN frame shown in FIG. 12 (time t45) is set earlier than a timing for starting to send out the IN frame shown in FIG. 11. That is to say, in consideration of retransmitted frames, a value of the timer that manages the start timing of the IN refresh is set such that the IN refresh is started at an earlier timing. In this way, even if the IN refresh is executed through a subsequent IN frame instead of the first IN frame, the IN refresh is executed in time for the start of copy (transfer) of OUT data stored in the reception buffer 126 of the field bus control unit 110 to the transmission buffer 166 of the internal bus control unit 130. That is to say, the IN data can be written into a field bus frame in the next control cycle.

<<h3: Limit of Retransmissions>>

Figure 13:
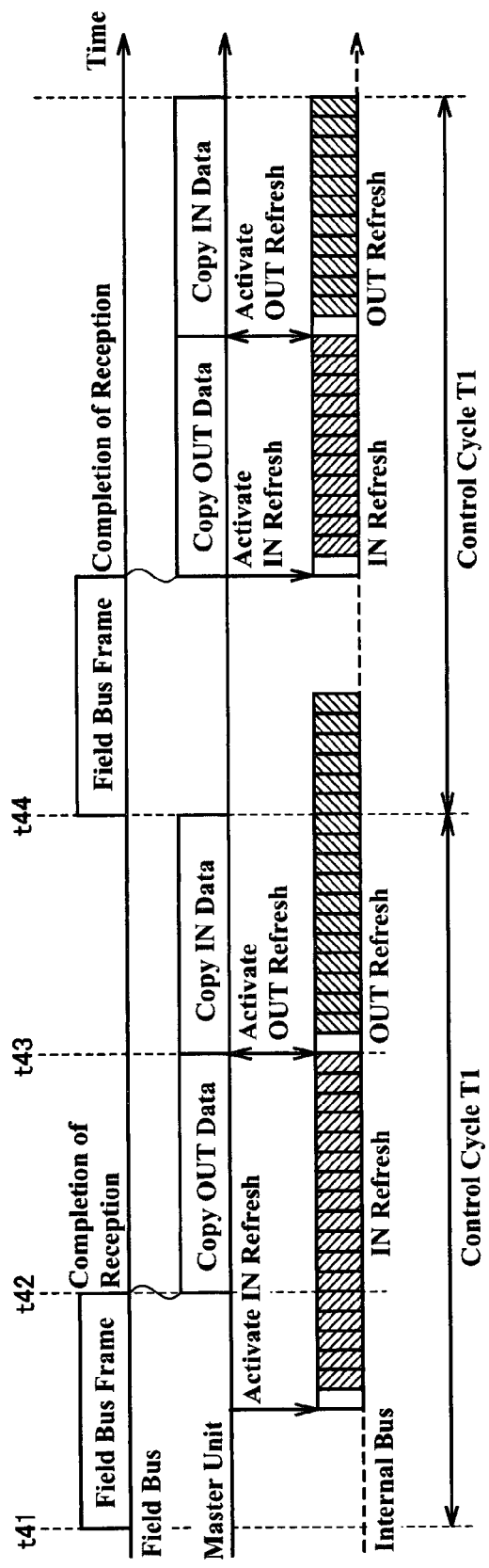
FIG. 13 is a time chart showing a limit of retransmissions in the operations of the OUT/IN refresh shown in FIG. 12.

FIG. 13 is a time chart showing a limit of retransmissions in the operations of the OUT/IN refresh shown in FIG. 12. The time chart of FIG. 13 shows an example in which the number of retransmissions of the OUT refresh and the IN refresh has been maximized. The limit of the number of retransmissions of an OUT frame and an IN frame (that is to say, a maximum time period that can be allocated to transmission of the OUT frame and the IN frame over the internal bus 30) conforms to the control cycle T1 in the field bus 4. Therefore, it is sufficient to determine a maximum value of the number of retransmissions of the OUT frame and the IN frame within the control cycle T1. It should be noted that, as it takes time (budget) to generate the OUT frame and the IN frame, the actual maximum value of the number of retransmissions is determined in consideration of such an overhead.

I. Modification Examples of First to Third Embodiments

While the above embodiments have illustrated a configuration in which the processor 100 of the master unit 10 gives notice of a start timing of IN refresh every time, it is permissible to employ a configuration in which each of the slave units 20 autonomously executes IN data refresh.

For example, if a timer included in the main processing device 2 in relation to communication over the field bus 4 is shared with the master unit 10 and the slave units 20, the master unit 10 may notify the slave units 20 of a timing of the IN refresh in advance based on an arrival timing (the control cycle T1 and a phase (an offset time period)) of a field bus frame. By employing this method, each of the slave units 20 autonomously executes the IN refresh at an appropriate timing.

Furthermore, all of the slave units 20 may be ordered to execute the IN refresh, and a specific slave unit 20 may be ordered to execute the IN refresh. For example, an order for the IN refresh can be skipped with respect to a slave unit 20 that includes only an output unit. In this way, the speed of data transfer over the internal bus 30 can be further increased.

J. Fourth Embodiment

The following describes a communication system including general-purpose computers (typically, personal computers) as a fourth embodiment.

Figure 14:
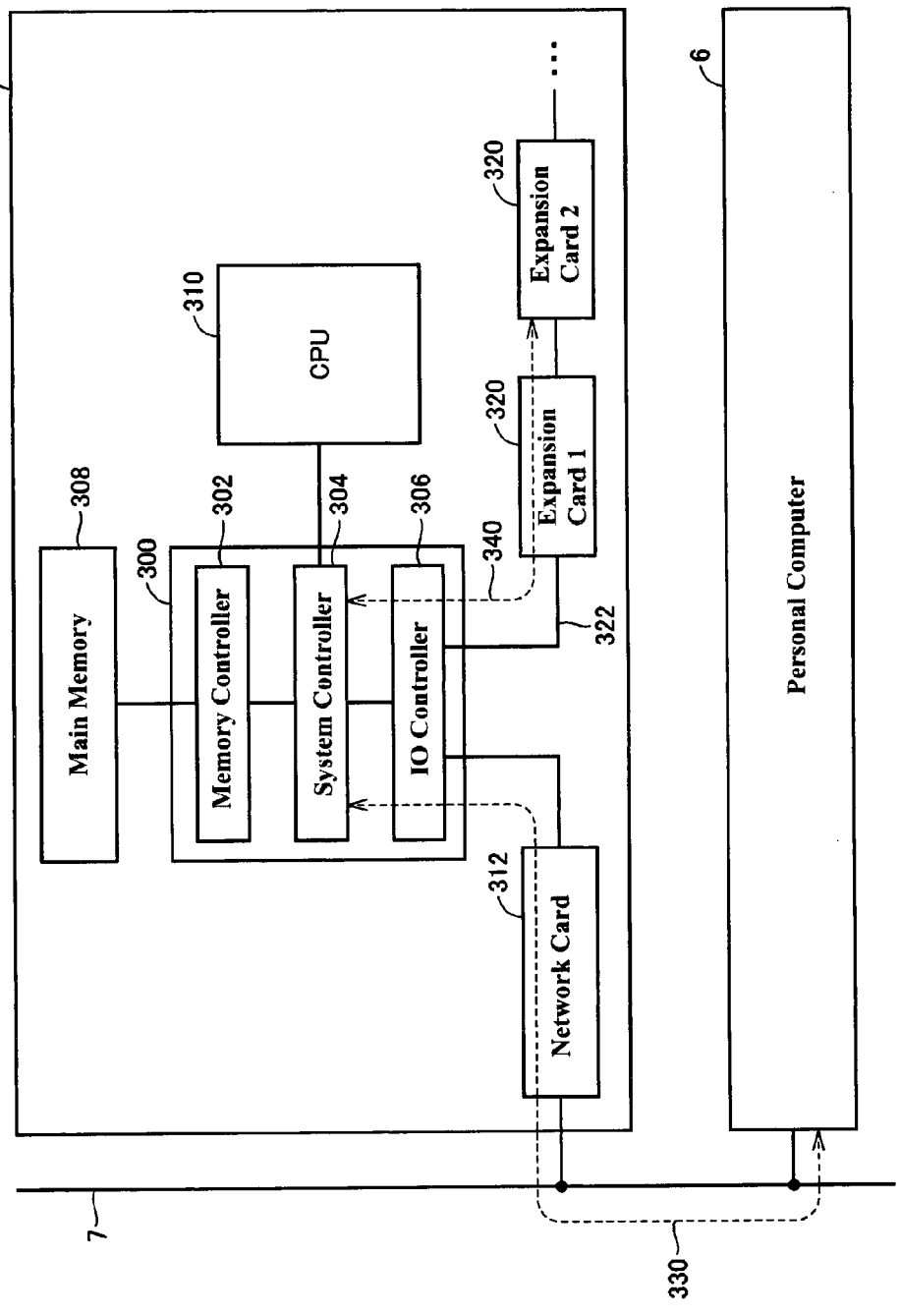
FIG. 14 is a schematic diagram showing an overall configuration of a communication system according to a fourth embodiment.

FIG. 14 is a schematic diagram showing an overall configuration of a communication system 5 according to the fourth embodiment. As shown in FIG. 14, the communication system 5 includes a plurality of personal computers 6 that are connected to one another via a LAN (Local Area Network) 7.

The personal computers 6 have a general-purpose architecture, and include a chipset 300, a main memory 308, a CPU 310, a network card 312, and one or more expansion cards 320. The chipset 300 is a component that controls an entirety of the personal computer 6, and includes a memory controller 302, a system controller 304, and an IO controller 306.

The memory controller 302 controls writing and reading of data to and from the main memory 308. The IO controller 306 controls data exchange between peripheral devices such as the network card 312 and the expansion cards 320. The IO controller 306 is connected to the peripheral devices via a suitable internal bus 322. The system controller 304 issues instruction codes to and obtains results from the CPU 310 in an appropriate order at appropriate timings in association with the memory controller 302 and the IO controller 306.

The main memory 308 is constituted by a non-volatile memory and holds instructions and data necessary for program execution on the CPU 310. The CPU 310 is an arithmetic device that sequentially executes designated instruction codes.

The network card 312 is an interface for transmitting/ receiving data to/from another device via the LAN 7. The network card 312 executes data transmission/reception in accordance with an instruction from the IO controller 306.

The expansion cards 320 include a device that provides auxiliary functions in addition to functions provided by the chipset 300 and the CPU 310. Examples of the expansion cards 320 include an auxiliary arithmetic device that executes processing in coordination with the CPU 310, such as a graphics card and DSP (Digital Signal Processing), and a signal conversion device that executes AD (Analog to Digital) conversion and DA (Digital to Analog) conversion.

For example, assume a case in which the personal computer 6 transmits data to another device (typically, another personal computer 6) in every predetermined cycle. In this case, data generated through processing of the expansion cards 320 is transmitted to the chipset 300 (the IO controller 306) via the internal bus 322 (a path 340 of FIG. 14), and a data packet including the transmitted data is transmitted from the network card 312 to another device via the LAN 7 (a path 330 of FIG. 14).

On the other hand, in a case where the personal computer 6 receives data from another device (typically, another personal computer 6) in every predetermined cycle, a data packet transmitted from another device is received by the network card 312 via the LAN 7 and transmitted to the chipset 300 (the IO controller 306) (the path 330 of FIG. 14), and data included in the transmitted data packet is transmitted to the expansion cards 320 via the internal bus 322 (the path 340 of FIG. 14).

A correspondence relationship between the configuration shown in FIG. 1 and the communication system 5 shown in FIG. 14 is as follows. The LAN 7 is equivalent to a first communication line, and the internal bus 322 is equivalent to a second communication line. The chipset 300 and the network card 312 are equivalent to a master unit, and the expansion cards 320 are equivalent to slave units. More specifically, the network card 312 is equivalent to a first communication unit, the IO controller 306 is equivalent to a second communication unit, and the system controller 304 (and the memory controller 302) is equivalent to an update unit.

In this configuration also, data transmission is executed in accordance with the procedure shown in FIG. 2. More specifically, processing is executed such that data transmission/reception to/from the expansion cards 320 is completed between completion of transmission/reception of a data packet to/from another device at a certain timing and arrival of a timing of transmission/reception of the next data packet. That is to say, after preceding data is received via the LAN 7, the system controller 304, which is equivalent to the update unit, updates data with the expansion cards via the internal bus 322 before arrival of subsequent data corresponding to the next cycle. In general, a transmission rate of the internal bus 322 is sufficiently higher than a transmission rate of the LAN 7, and it is therefore possible to make a time period required to complete data transmission/reception via the internal bus 322 sufficiently shorter than a cycle of a data packet.

By employing such a processing procedure, for example, in a case where the plurality of personal computers 6 execute processing in coordination with one another, data generated or obtained by the expansion cards 320 can be transmitted to another device in a shorter delay time period. Also, data provided by another device can be provided to the expansion cards 320 in a shorter delay time period. This makes it possible to increase a processing speed and avoid problems such as data inconsistency.

In a case where the plurality of expansion cards 320 are connected via the internal bus 322, if each one of the expansion cards 320 is independently connected to the chipset 300, the processing shown in FIG. 2 is executed independently for each one of the expansion cards 320. In contrast, if the plurality of expansion cards 320 are connected in parallel to a shared internal bus 322, the chipset 300 sequentially selects expansion cards 320 that are required to transmit/receive data in chronological order, transmits/receives data in a selected time period, and completes necessary data transmission/reception before arrival of a timing for transmitting/receiving the next data packet.

K. Modification Example of Fourth Embodiment

While the fourth embodiment has illustrated a configuration in which the internal expansion cards 320 connected via the internal bus 322 serve as the slave units, these slaves may be external devices connected to the personal computers. The following describes an example in which peripheral devices connected to the personal computers serve as the slave units as a modification example of the fourth embodiment.

Figure 15:
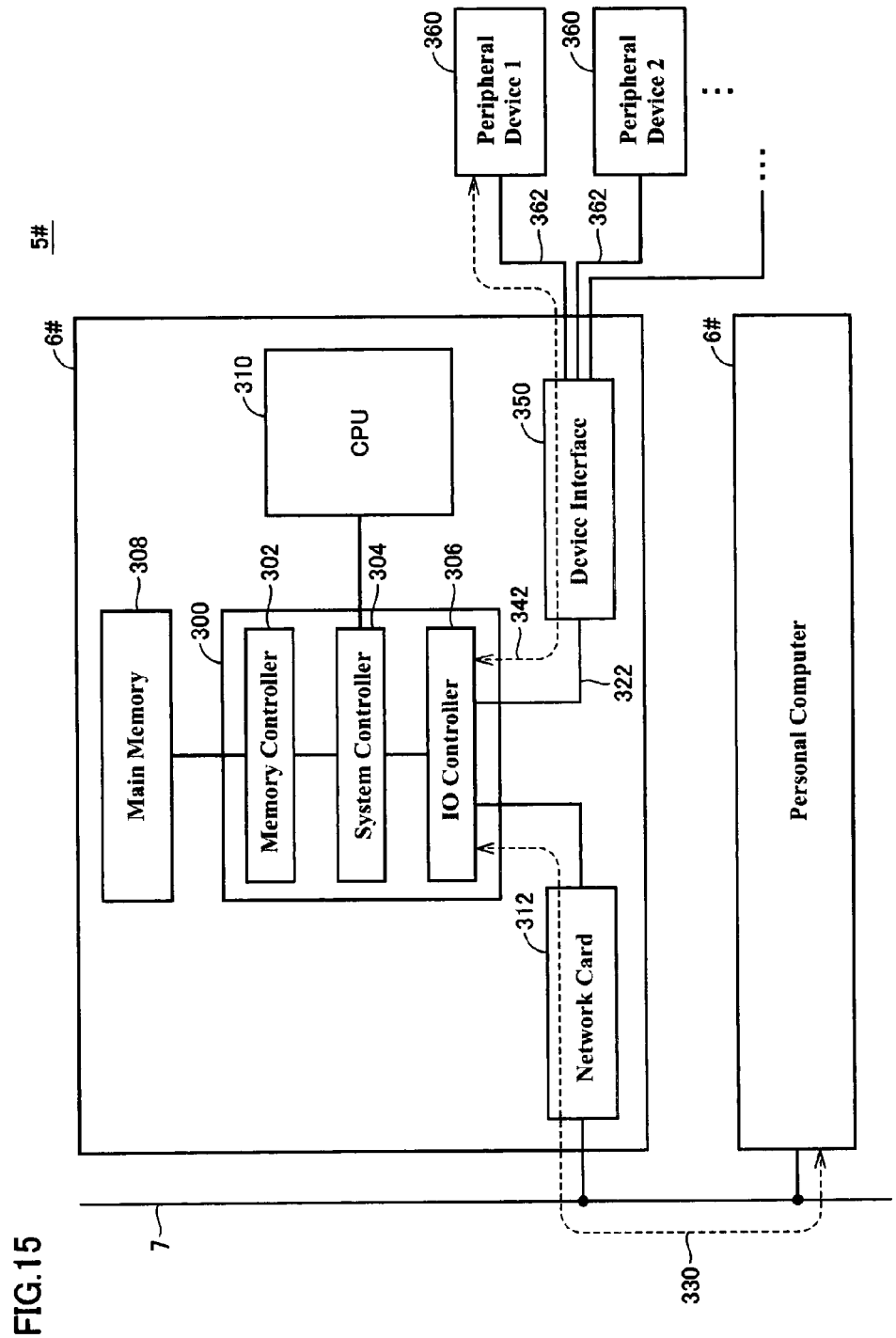
FIG. 15 is a schematic diagram showing an overall configuration of a communication system according to a modification example of the fourth embodiment.

FIG. 15 is a schematic diagram showing an overall configuration of a communication system 5# according to a modification example of the fourth embodiment. As shown in FIG. 15, personal computers 6# constituting the communication system 5# differ from the personal computers 6 shown in FIG. 14 in that peripheral devices 360 are connected thereto, and in that they include a device interface 350 for connecting to the peripheral devices 360.

The device interface 350 can exchange data with the peripheral devices 360 in accordance with a suitable communication method. Examples of the communication method include a serial bus compliant with a USB (Universal Serial Bus), IEEE 1394, and RS-232 (Recommended Standard 232), and a parallel bus compliant with IEEE 1284.

The peripheral devices 360 include a device accessed by the personal computer 6#. Examples of the peripheral devices 360 include an external storage device such as a hard disk, and an optical reading device that reads data from a recording medium such as a DVD-ROM.

For example, assume a case in which the personal computer 6# transmits data to another device (typically, another personal computer 6#) in every predetermined cycle. In this case, data from the peripheral devices 360 is transmitted from the device interface 350 to the chipset 300 (the IO controller 306) via communication lines 362 (a path 342 of FIG. 15), and a data packet including the transmitted data is transmitted from the network card 312 to another device via the LAN 7 (the path 330 of FIG. 15).

On the other hand, in a case where the personal computer 6# receives data from another device (typically, another personal computer 6#) in every predetermined cycle, a data packet transmitted from another device is received by the network card 312 via the LAN 7 and transmitted to the chipset 300 (the IO controller 306) (the path 330 of FIG. 15), and data included in the transmitted data packet is transmitted from the device interface 350 to the peripheral devices 360 via the communication lines 362 (the path 342 of FIG. 15).

A correspondence relationship between the configuration shown in FIG. 1 and the communication system 5# shown in FIG. 15 is as follows. The LAN 7 is equivalent to a first communication line, and the communication lines 362 (and the internal bus 322) are equivalent to a second communication line. The chipset 300 and the network card 312 are equivalent to a master unit, and the peripheral devices 360 are equivalent to slave units. More specifically, the network card 312 is equivalent to a first communication unit, the IO controller 306 is equivalent to a second communication unit, and the system controller 304 (and the memory controller 302) is equivalent to an update unit.

In this configuration also, data transmission is executed in accordance with the procedure shown in FIG. 2. More specifically, processing is executed such that data transmission/reception to/from the expansion cards 320 is completed between completion of transmission/reception of a data packet to/from another device at a certain timing and arrival of a timing of transmission/reception of the next data packet. That is to say, after preceding data is received via the LAN 7, the system controller 304, which is equivalent to the update unit, updates data with the peripheral devices 360 via the communication lines 362 before arrival of subsequent data corresponding to the next cycle.

If the plurality of peripheral devices 360 are connected via the device interface 350 and the communication lines 362 independently from one another, the processing shown in FIG. 2 is executed independently for each one of the peripheral devices 360.

By employing such a processing procedure, for example, in a case where a plurality of personal computers execute processing in coordination with one another, data from the peripheral devices 360 can be transmitted to another device in a shorter delay time period. Also, data provided by another device can be provided to the peripheral devices 360 in a shorter delay time period. This makes it possible to increase a processing speed and avoid problems such as data inconsistency.

L. Advantages

According to the first to third embodiments described above, each time a field bus frame is received periodically via the field bus 4, the remote IO devices 3 can write IN data that was refreshed at a timing after a field bus frame was received immediately therebefore. Furthermore, OUT data included in a received field bus frame is output to the slave units 20 before arrival of a subsequent field bus frame.

By optimizing a timing of such data update via the field bus 4 and the internal bus 30, data update between devices can be performed at faster speed. Therefore, the accuracy of the control program executed on the main processing device 2 can be improved. For example, the control system according to the present embodiments is favorable for motion control in which the positional accuracy is essential.

According to the fourth embodiment and the modification example thereof, in periodical data transmission/reception between personal computers, internal data of a personal computer or data from a peripheral device can be reflected in a shorter delay time period. Therefore, more appropriate processing can be realized in a configuration in which a plurality of personal computers execute processing in association with one another.

The embodiments disclosed herein are to be considered in all respects as illustrative, and not restrictive. The scope of the present invention is indicated by the claims, rather than by the above description, and is intended to embrace all changes that come within the meaning and scope of equivalency of the claims.

INDEX TO THE REFERENCE NUMERALS

1 PLC system
2 main processing device
3 remote IO device
4 field bus
5, 5# communication system
6, 6# personal computer
10 master unit
12, 52 communication module
12a, 52a timer
20 slave unit
30, 70, 322 internal bus
40 power source unit
50 CPU unit
60 IO unit
100 processor
110 field bus control unit
112 reception unit
114 transmission unit
120 field bus communication controller
122, 302 memory controller
124 FIFO memory
126, 164 reception buffer
128, 166 transmission buffer
130 internal bus control unit
132 internal bus communication controller
142, 152, 224, 234, 244, 254 transmission circuit
144, 154, 222, 232, 242, 252 reception circuit
160 storage unit
162 shared memory
200 IO module
210 IO memory
220, 240 communication controller
300 chip set
304 system controller
306 controller
308 main memory
310 CPU
312 network card
320 expansion card
350 device interface
360 peripheral device
362 communication line

The invention claimed is:

1. A control device constituting at least a part of a control system, the control device comprising:
 a master control unit connected to a first communication line; and
 at least one slave control unit connected to the master control unit via a second communication line, wherein
 the master control unit includes:
  a first communication unit configured to transmit/receive data to/from another device via the first communication line in every predetermined control cycle;
  a second communication unit configured to transmit/receive data to/from the slave control unit via the second communication line in a time period shorter than the control cycle; and
  an update unit configured to, after preceding data is received via the first communication line, update data with the slave control unit via the second communication line before arrival of subsequent data corresponding to a next control cycle.

2. The control device according to claim 1, wherein the slave control unit includes an input unit configured to collect a state value of an externally input signal, and the update unit causes the input unit to newly collect a state value and transmit the collected state value to the master control unit as update processing.

3. The control device according to claim 2, wherein the update unit orders transmission of the collected state value to the master control unit multiple times.

4. The control device according to claim 2, wherein the update unit starts the update processing for the input unit from a time point that precedes a time point at which the subsequent data is supposed to arrive by a predetermined time period.

5. The control device according to claim 2, wherein the slave control unit further includes an output unit configured to output a signal of a designated state value, and the update unit updates the signal output by the output unit in accordance with at least a part of data received via the first communication line as update processing.

6. The control device according to claim 5, wherein the update unit transmits an instruction for updating the signal output by the output unit multiple times.

7. The control device according to claim 5, wherein the master control unit further includes:
   a first buffer memory configured to store data transmitted over the first communication line;
   a second buffer memory configured to store data transmitted over the second communication line; and
   a transfer circuit configured to control data transfer between the first buffer memory and the second buffer memory, and
the update unit starts the update processing for the input unit such that storage of the state value collected by the input unit into the second buffer memory, as well as subsequent data transfer from the second buffer memory to the first buffer memory, is completed before arrival of the subsequent data.

8. The control device according to claim 7, wherein the update unit starts the update processing for the output unit after reception of the preceding data, as well as subsequent transfer of the data from the first buffer memory to the second buffer memory, is completed.

9. The control device according to claim 7, wherein the update unit
   executes the update processing for the input unit in parallel with transfer of the preceding data from the first buffer memory to the second buffer memory, and
   executes the update processing for the output unit in parallel with transfer of the state value collected by the input unit from the second buffer memory to the first buffer memory.

10. The control device according to claim 1, wherein the master control unit further includes a timer shared with another device connected via the first communication line, and
the update unit determines a start timing of update processing based on a value measured by the timer.

11. An information processing device constituting at least a part of a communication system, the information processing device comprising:
   a master unit connected to a first communication line; and
   at least one slave unit connected to the master unit via a second communication line, wherein
the master unit includes:
   a first communication unit configured to transmit/receive data to/from another device via the first communication line in every predetermined cycle;
   a second communication unit configured to transmit/receive data to/from the slave unit via the second communication line in a time period shorter than the cycle; and
   an update unit configured to, after preceding data is received via the first communication line, update data with the slave unit via the second communication line before arrival of subsequent data corresponding to a next cycle.

12. A control method in a control device including a master control unit connected to a first communication line and at least one slave control unit connected to the master control unit via a second communication line, the control device constituting at least a part of a control system, the control method comprising:
   a step of, in the master control unit, transmitting/receiving data to/from another device via the first communication line in every predetermined control cycle;
   a step of, in the master control unit, transmitting/receiving data to/from the slave control unit via the second communication line in a time period shorter than the control cycle; and
   a step of, in the master control unit, after preceding data is received via the first communication line, updating data with the slave control unit via the second communication line before arrival of subsequent data corresponding to a next control cycle.

13. A control method in an information processing device including a master unit connected to a first communication line and at least one slave unit connected to the master unit via a second communication line, the information processing device constituting at least a part of a communication system, the control method comprising:
   a step of, in the master unit, transmitting/receiving data to/from another device via the first communication line in every predetermined cycle;
   a step of, in the master unit, transmitting/receiving data to/from the slave unit via the second communication line in a time period shorter than the cycle; and
   a step of, in the master unit, after preceding data is received via the first communication line, updating data with the slave unit via the second communication line before arrival of subsequent data corresponding to a next cycle.

* * * * *